(12) United States Patent
Faaborg et al.

(10) Patent No.: US 9,947,205 B2
(45) Date of Patent: *Apr. 17, 2018

(54) SOMATOSENSORY TYPE NOTIFICATION ALERTS

(71) Applicant: Google Inc., Moutain View, CA (US)

(72) Inventors: Alexander Faaborg, Mountain View, CA (US); Gabriel Aaron Cohen, Alameda, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,357

(22) Filed: Aug. 7, 2017

(65) Prior Publication Data
US 2017/0337800 A1 Nov. 23, 2017

Related U.S. Application Data

(63) Continuation of application No. 15/238,964, filed on Aug. 17, 2016, now Pat. No. 9,747,775, which is a
(Continued)

(51) Int. Cl.
*G08B 23/00* (2006.01)
*G08B 21/18* (2006.01)
(Continued)

(52) U.S. Cl.
CPC ............ *G08B 21/18* (2013.01); *G08B 6/00* (2013.01); *H04M 19/04* (2013.01); *H04W 68/00* (2013.01)

(58) Field of Classification Search
CPC ................................................ G06F 2203/011
(Continued)

(56) References Cited

U.S. PATENT DOCUMENTS 7,801,569 B1 9/2010 Zellner
8,004,391 B2 8/2011 Cruz Hernandez
(Continued)

FOREIGN PATENT DOCUMENTS

CN 101809525 8/2010
CN 101896962 11/2010
(Continued)

OTHER PUBLICATIONS

Combined Search and Examination Report from counterpart British Application No. GB1500667.9. dated Mar. 2, 2015, 8 pp.
(Continued)

*Primary Examiner* — Toan N Pham
(74) *Attorney, Agent, or Firm* — Shumaker & Sieffert, P.A.

(57) ABSTRACT

A computing device is described that can receive contextual information related to a user associated with the computing device. The contextual information may relate to at least one of a physiological condition of the user at a current time or a type of activity associated with the user at the current time. The computing device can select, based at least in part on the contextual information, a type of alert to output as an indication of notification data. The type of alert may include at least one of an electric stimulus type alert, a shape-memory alloy type alert, and a vibration type alert. Responsive to selecting the type of alert, the computing device can output an alert based on the notification data, the alert being of the selected type of alert.

20 Claims, 7 Drawing Sheets

Related U.S. Application Data continuation of application No. 14/806,961, filed on Jul. 23, 2015, now Pat. No. 9,443,413, which is a continuation of application No. 14/564,898, filed on Dec. 9, 2014, now Pat. No. 9,147,332, which is a continuation of application No. 14/176,836, filed on Feb. 10, 2014, now Pat. No. 8,941,500.

(60) Provisional application No. 61/930,776, filed on Jan. 23, 2014.

(51) Int. Cl.
*H04M 19/04* (2006.01)
*H04W 68/00* (2009.01)
*G08B 6/00* (2006.01)

(58) Field of Classification Search
USPC .................. 340/573.1, 539.11; 455/567
See application file for complete search history.

(56) References Cited

U.S. PATENT DOCUMENTS

| | | | |
|---|---|---|---|
| 8,452,345 B2 | 5/2013 | Lee et al. | |
| 8,941,500 B1 | 1/2015 | Faaborg et al. | |
| 9,147,332 B1 | 9/2015 | Faaborg et al. | |
| 9,747,775 B2 * | 8/2017 | Faaborg | G08B 21/18 |
| 2002/0191011 A1 | 12/2002 | Rasouli | |
| 2003/0181116 A1 | 9/2003 | Van Heerden et al. | |
| 2004/0127198 A1 | 7/2004 | Roskind et al. | |
| 2004/0203673 A1 | 10/2004 | Seligmann | |
| 2005/0152325 A1 | 7/2005 | Gonzales | |
| 2006/0116175 A1 | 6/2006 | Chu | |
| 2008/0204266 A1 | 8/2008 | Malmberg et al. | |
| 2009/0088659 A1 | 4/2009 | Graham et al. | |
| 2009/0153350 A1 | 6/2009 | Steger et al. | |
| 2009/0305744 A1 | 12/2009 | Ullrich | |
| 2010/0022279 A1 | 1/2010 | Hoberg et al. | |
| 2011/0169622 A1 | 7/2011 | Billmaier et al. | |
| 2012/0229276 A1 | 9/2012 | Ronkainen | |
| 2013/0099907 A1 | 4/2013 | Ching et al. | |
| 2013/0113715 A1 | 5/2013 | Grant et al. | |
| 2013/0316744 A1 | 11/2013 | Newham et al. | |
| 2015/0325098 A1 | 11/2015 | Faaborg et al. | |
| 2016/0358450 A1 | 12/2016 | Faaborg et al. | |

FOREIGN PATENT DOCUMENTS

| | | |
|---|---|---|
| CN | 102057656 A | 5/2011 |
| CN | 103064509 | 4/2013 |
| CN | 103092406 | 5/2013 |
| CN | 103227855 A | 7/2013 |
| CN | 103503428 A | 1/2014 |
| WO | 2009151807 A1 | 12/2009 |

OTHER PUBLICATIONS

English Translation of Office Action from counterpart German Patent Application No. 102015000652.5, dated May 22, 2015, 7 pp.
Examination Report from counterpart European Application No. 102015000652.5, dated Oct. 2, 2015, 4 pp.
Miraoui, et al, "Dynamic Context-aware Adaptation of Mobile Phone incoming Call Indication Using Context Similarity," World Congress on Computer and Information Technology, 2013, 7 pp.
Notification of First Office Action from Chinese Application No. 201510036633.2, dated Feb. 19, 2016 22 pgs.
Notification of the Second Office Action from Chinese Patent Application No. 201510036633.2, dated Aug. 24, 2016 27 pgs.
Office Action from German Patent Application No. 10 2015 000 652.5, dated May 22, 2015 7 pp.
Prosecution History from U.S. Appl. No. 14/176,836 from May 7, 2014 through Sep. 12, 2014, 27 pp.
Prosecution History from U.S. Appl. No. 14/564,898 from Dec. 11, 2014 through Jul. 16, 2015, 33 pp.
Prosecution History from U.S. Appl. No. 14/806,961 from Feb. 25, 2016 through May 20, 2016, 22 pp.
Siewiorek, et al., "SenSay: a context-aware mobile phone," Wearable Computers, Oct. 21-23, 2003, 2 pp.
Prosecution History from U.S. Appl. No. 15/238,964 from Dec. 30, 2016 through May 12, 201, 15 pp.
Notification of Reexamination, and translation thereof, from counterpart Chinese Application No. 201510036633.2, filed Oct. 25, 2017, 18 pp.

* cited by examiner

SOMATOSENSORY TYPE NOTIFICATION ALERTS

RELATED APPLICATIONS

This application is a Continuation of application Ser. No. 15/238,964, filed Aug. 17, 2016, now U.S. Pat. No. 9,747,775, which is a Continuation of application Ser. No. 14/806,961, filed Jul. 23, 2015, now U.S. Pat. No. 9,443,413, which is a Continuation of application Ser. No. 14/564,898, filed Dec. 9, 2014, now U.S. Pat. No. 9,147,332, which is a Continuation of application Ser. No. 14/176,836, filed Feb. 10, 2014, now U.S. Pat. No. 8,941,500, each of which claims the benefit of U.S. Provisional Application No. 61/930,776, filed Jan. 23, 2014, the entire contents of each of which are hereby incorporated by reference.

BACKGROUND

Many modern computing devices (e.g., mobile telephones, wearable computing devices, etc.) are capable of receiving notifications associated with a user of the computing device. For example, a computing device may receive notification data indicating that the computing device received a new instant message associated with an instant messaging account of the user. To alert the user to the receipt of the notification data and/or the new instant message indicated by the notification data, the computing device may output an alert (e.g., a visual, audible, and/or haptic type alert) based on the notification data to indicate to the user that the new instant message was received. Sometimes, the output of a notification based alert may fail in obtaining the attention of the user at a particular time. At other times, although the output of an alert may succeed in obtaining the attention of the user, the output of the alert may be perceived as a distraction, disruption, and/or annoyance, at a particular time.

SUMMARY

In one example, the disclosure is directed to a method that includes receiving, by a computing device, contextual information related to a user associated with the computing device, wherein the contextual information relates to at least one of a physiological condition of the user at a current time or a type of activity associated with the user at the current time. The method further includes selecting, by the computing device, based at least in part on the contextual information, a type of alert to output as an indication of notification data, wherein the type of alert comprises at least one of an electric stimulus type alert, a shape-memory alloy type alert, and a vibration type alert, and responsive to selecting the type of alert, outputting, by the computing device, an alert based on the notification data, the alert being of the selected type of alert.

In another example, the disclosure is directed to a computing device that includes at least one processor and at least one module operable by the at least one processor to receive contextual information related to a user associated with the computing device, wherein the contextual information relates to at least one of a physiological condition of the user at a current time or a type of activity associated with the user at the current time. The at least one module is further operable by the at least one processor to select, based at least in part on the contextual information, a type of alert to output as an indication of notification data, wherein the type of alert comprises at least one of an electric stimulus type alert, a shape-memory alloy type alert, and a vibration type alert, and responsive to selecting the type of alert, output an alert based on the notification data, the alert being of the selected type of alert.

In another example, the disclosure is directed to a computer readable storage medium including instructions that, when executed, configure one or more processors of a computing device to receive contextual information related to a user associated with the computing device, wherein the contextual information relates to at least one of a physiological condition of the user at a current time or a type of activity associated with the user at the current time. The instructions, when executed, further configure the one or more processors of the computing device to select, based at least in part on the contextual information, a type of alert to output as an indication of notification data, wherein the type of alert comprises at least one of an electric stimulus type alert, a shape-memory alloy type alert, and a vibration type alert, and responsive to selecting the type of alert, output an alert based on the notification data, the alert being of the selected type of alert.

The details of one or more examples are set forth in the accompanying drawings and the description below. Other features, objects, and advantages of the disclosure will be apparent from the description and drawings, and from the claims.

DETAILED DESCRIPTION

Figure 1:
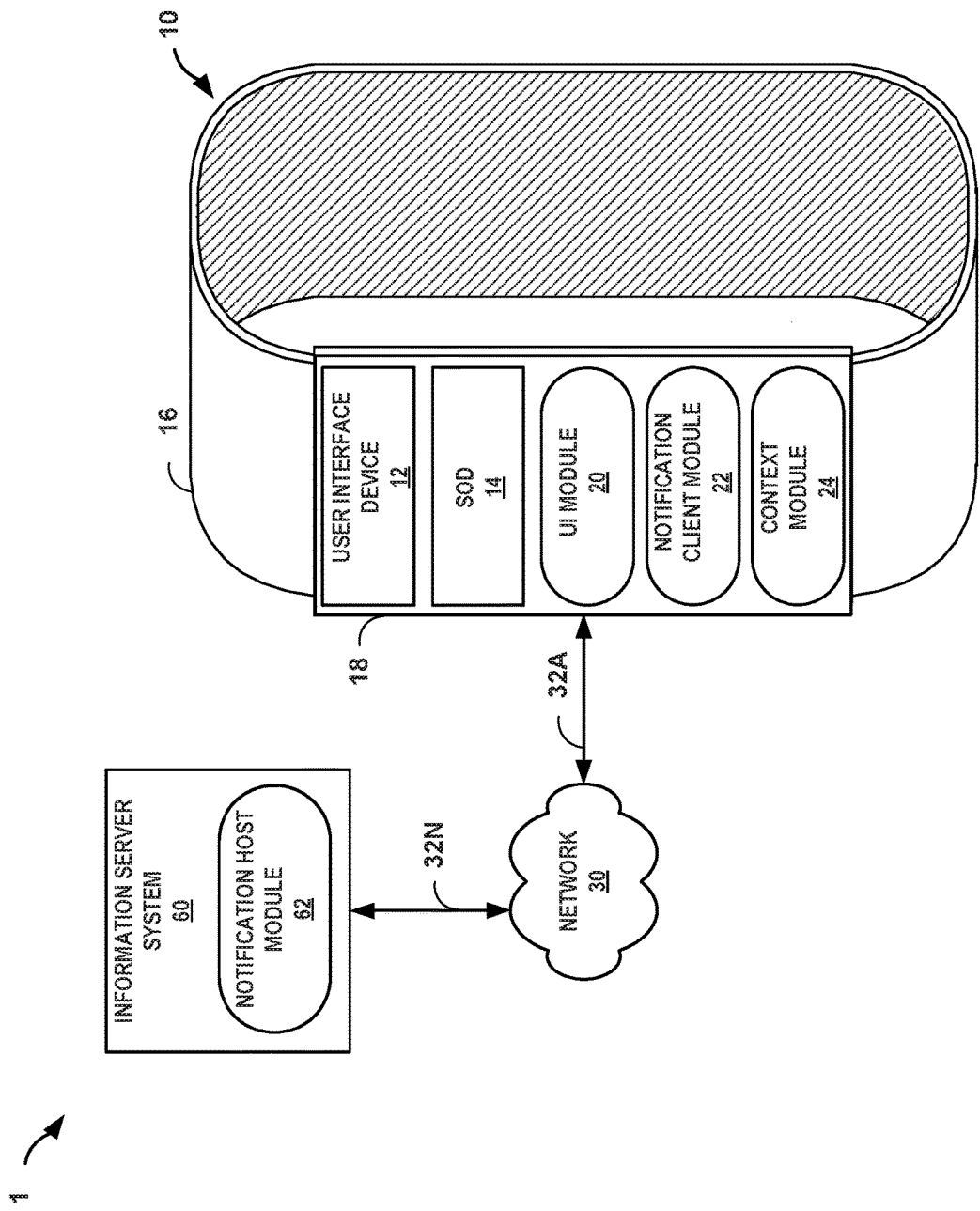
FIG. 1 is a conceptual diagram illustrating an example computing system that includes an information server system that outputs notification data to an example computing device, in accordance with one or more aspects of the present disclosure.

In general, techniques of this disclosure may enable a computing device (e.g., a wearable computing device, a mobile computing device, etc.) to automatically determine a type of somatosensory alert to output as an indication of notification data. The computing device may determine a type of somatosensory alert (e.g., an electric stimulus type alert, a shape-memory alloy type alert, a vibration type alert, etc.) to output at a current time based on a determination made by the computing device as to a physiological state of the user and/or activity being performed by the user at the current time.

For example, a computing device may receive notification data from an application or platform executing at the computing device and/or from a server as part of a notification service executing at a network (e.g., in a cloud). The computing device that receives notification data may also receive contextual information related to a user of the computing device. The computing device may select, based at least in part on the contextual information, a type of alert or cue to output as an indication of notification data. For instance, based on the contextual information, the computing device may determine a physiological condition of the user (e.g., whether the user is stressed, relaxed, etc.) and/or a type of activity associated with the user (e.g., walking, jogging, reading, driving, etc.) at the current time. The computing device may select a type of somatosensory alert to output as an indication of notification data (e.g., to indication the receipt of notification data), at the current time, according to the determined physiological condition and/or the type of activity that the computing device infers from the contextual information.

In some instances, the computing device may select a more intense type of somatosensory alert (e.g., an electric stimulus type alert) when the computing device determines that the contextual information indicates that the user is stressed and may select a less intense (e.g., more subtle) type of somatosensory alert (e.g., a shape-memory alloy, type alert) when the computing device determines that the contextual information indicates that the user is relaxed. In some examples, when the computing device determines that the contextual information indicates that the user may be performing a physical and/or focus intensive type of activity, the computing device may select a more intense type of somatosensory alert (e.g., an intense vibration type alert), and, when the computing device determines that the user may be performing a non-physical and/or non-focus intensive type of activity, the computing device may select a less intense (e.g., more subtle) type of somatosensory alert (e.g., a mild vibration type alert or a shape-memory alloy type alert).

In this manner, the computing device may adapt or change a way in which the computing device outputs an alert of notification data such that the output of the alerts conforms to the physiological condition and/or activity associated with the user at a current time. By selecting the type of alert based at least in part on contextual information related to the user in this way, the computing device according to the techniques of this disclosure may improve a likelihood that the user of the computing device perceives (e.g., feels) a notification-based alert being outputted by the computing device, while reducing the extent to which the alert distracts, disturbs, or otherwise annoys the user.

Throughout the disclosure, examples are described in which a computing device and/or a computing system may analyze information (e.g., locations, speeds, physiological parameters, active application, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, physiological parameters, active application, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information about the user is collected and used by the computing device.

FIG. 1 is a conceptual diagram illustrating an example computing system 1 that includes an information server system 60 that outputs notification data to an example computing device 10, in accordance with one or more aspects of the present disclosure. Computing system 1 of FIG. 1 is an example computing system that includes computing device 10, information server system 60, and network 30.

Network 30 may include any public or private communication network, for instance, a cellular, Wi-Fi®, and/or other type of network for transmitting data between computing devices. Computing device 10 and information server system 60 may send and receive data across network 30 using any suitable communication techniques. For example, computing device 10 may be operatively coupled to network 30 using network link 32A and information server system 60 may be operatively coupled to network 30 by network link 32N. Network 30 may include network hubs, network switches, network routers, etc., that are operatively intercoupled thereby providing for the exchange of information between computing device 10 and information server system 60. In some examples, network links 32A and 32N (collectively, "network links 32") may be Ethernet, ATM, or other network connections. Such connections may be wireless and/or wired connections.

information server system 60 may include any suitable remote computing system, such as one or more desktop computers, laptop computers, mainframes, servers, cloud computing systems, etc. capable of sending and receiving information (e.g., notification data) across network link 32N to network 30. In some examples, information server system 60 may include a host server for a notification system service. One or more computing devices, such as computing device 10, may access a notification service hosted by information server system 60 for transmitting and/or receiving notification data between platforms, applications, and services executing at the one or more computing devices. In some examples, information server system 60 may include a cloud computing system that provides notification services through network 30 to the one or more computing devices that access the notification services via access to the cloud provided by information server system 60.

In the example of FIG. 1, information server system 60 includes notification host module 62. Module 62 may perform operations described herein using software, hardware, firmware, or a mixture of hardware, software, and/or firmware residing in and/or executing at information server system 60. In some examples, information server system 60 may execute module 62 with multiple processors or multiple devices. Information server system 60 may execute module 62 as a virtual machine executing on underlying hardware. Module 62 may execute as one or more services of an operating system or computing platform. Module 62 may execute as one or more executable programs at an application layer of a computing platform.

Notification host module 62 may perform functions for routing notification data between one or more computing devices, such as computing device 10, over network 30. Notification host module 62 may perform functions for hosting a notification service and outputting notification data for transmission to one or more computing devices, including computing device 10. For example, notification host module 62 may receive notification data that indicates a message was received by an instant messaging account associated with computing device 10 and may output the notification data for transmission across network 30 to computing device 10.

As described below, computing device 10 may output somatosensory type alerts (e.g., an electric stimulus type alert, a shape-memory alloy type alert, and a vibration type alert, etc.) based on notification data. Computing device 10 may receive notification data from notification host module 62 of information server system 60 via network links 32A. A somatosensory type alert may indicate that computing device 10 has received notification data.

As used herein, a somatosensory type alert or a type of somatosensory alert is defined as any type of cue, alert, or indication generated by a computing device (e.g., computing device 10) that can be perceived by the somatosensory system of a body of a person. The human somatosensory system includes the sensory receptors and nerves of a person's skin, bones, tissue, muscle, joints, internal organs, etc., that enable the person to detect varying levels of touch, temperature, and/or pressure user of computing device 10 can perceive or feel a somatosensory type alert from a computing device by detecting touch, temperature, and/or pressure generated by computing device 10. In other words, unlike visual cues, audible alerts, and/or indications of smell, which a user may perceive using; respectively, his or her sense of sight, hearing, and/or smell, a user of computing device 10 may detect a somatosensory type alert by perceiving touch, temperature, and/or pressure using the somatosensory system of his or her body. Various types of somatosensory type alerts may exist, and include, but are not limited to, an electric stimulus type alert, a vibration type alert, a shape-memory alloy type alert.

In the example of FIG. 1, computing device 10 is a wearable computing device (e.g., a computerized watch, computerized eyewear, computerized headwear, computerized gloves, etc.). However, in other examples, computing device 10 may be a tablet computer, a mobile phone, a personal digital assistant (PDA), a laptop computer, a gaming system, a media player, an e-book reader, a television platform, an automobile navigation system, or any other type of mobile and/or non-mobile computing device that is configured to receive notification data from information server system 60 and output a somatosensory type alert (e.g., a vibration type alert, a shape-memory alloy type alert, an electric stimulus type of alert, etc.) based on notification data to provide an indication of the receipt of the notification data.

As shown in FIG. 1, in some examples, computing device 10 may include attachment device 16 and electrical housing 18. Housing 18 of computing device 10 includes a physical portion of a wearable computing device that houses a combination of hardware, software, firmware, and other electrical components of computing device 10. For example, FIG. 1 shows that within housing 18, computing device 10 may include a user interface device (UID) 12, somatosensory output device (SOD) 14, user interface (UI) module 20, notification client module 22, and context module 24. Modules 20, 22, and 24 may perform operations described herein using software, hardware, firmware, or a mixture of hardware, software, and/or firmware residing in and/or executing at computing device 10. Computing device 10 may execute modules 20, 22, and 24 with one or more processors located within housing 18. In some examples, computing device 10 may execute modules 20, 22, and 24 as one or more virtual machines executing on underlying hardware of computing device 10 located within housing 18. Modules 20, 22, and 24 may execute as one or more services or components of operating systems or computing platforms of computing device 10. Modules 20, 22, and 24 may execute as one or more executable programs at application layers of computing platforms of computing device 10. In other examples, UID 12, SOD 14, and/or modules 20, 22, and 24 may be arranged remotely to housing 18 and be remotely accessible to computing device 10, for instance, via interaction by computing device 10 with one or more network services operating at network 30 in a network cloud.

Attachment device 16 may include a physical portion of a wearable computing device that comes in contact with a body (e.g., tissue, muscle, skin, hair, clothing, etc.) of a user when the user is wearing the computing device. For example, in cases where computing device 10 is a watch, attachment device 16 may be a watch band that fits around a user's wrist and comes in contact with the skin of the user, when computing device 10 is eyewear or headwear, attachment device 16 may be a portion of the frame of the eyewear or headwear that fits around a user's head, and when computing device 10 is a glove, attachment device 16 may be the material of the glove that conforms to the fingers and hand of a user.

UID 12 of computing device 10 may include a respective input and/or output device for computing device 10. UID 12 may be implemented using one or more various technologies. For instance, UID 12 may function as input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as output (e.g., display) device using any one or more display devices, such as a liquid crystal display (LCD), a dot matrix display, a light emitting diode (LED) display, an organic light-emitting diode (OLED) display, e-ink, or similar monochrome or color displays capable of outputting visible information to a user of computing device 10, In some examples, UID 12 may include a presence-sensitive display that may include a display device and receive tactile input from a user of computing device 10. UID 12 may receive indications of tactile input by detecting one or more gestures from a user (e.g., the user touching or pointing to one or more locations of UID 12 with a finger or a stylus pen). UID 12 may present output to a user, for instance at a presence-sensitive display. UID 12 may present the output as a graphical user interface (e.g., a user interface for viewing an alert based on notification data), which may be associated with functionality provided by computing device 10. For example, UID 12 may present various user interfaces related to the functionality of computing platforms, operating systems, applications, and/or services executing at or accessible by computing device 10 (e.g., notification services, electronic message applications, Internet browser applications, mobile or desktop operating systems, etc.). A user may interact with a user interface presented at UID 12 to cause computing device 10 to perform operations relating to functions, UI module 20 may receive and interpret inputs detected at UID 12 (e.g., as a user provides one or more gestures at one or more locations of UID 12 at which a user interface is displayed) and input detected at other input devices of computing device 10 (e.g., microphones, physical buttons, etc.). UI module 20 may relay information about the input detected at computing device 10 to one or more associated platforms, operating systems, applications, and/or services executing at computing device 10, to cause computing device 10 to perform functions.

UI module 20 also may receive information and instructions from one or more associated platforms, operating systems, applications, and/or services executing at computing device 10 (e.g., notification client modules 22, etc.) for generating a graphical user interface or for providing a somatosensory type user interface. In addition, UI module 20 may act as a respective intermediary between the one or more associated platforms, operating systems, applications, and/or services executing at computing device 10 and various output devices of computing device 10 (e.g., UID 12, SOD 14, a speaker, a LED indicator, other output devices, etc.) to produce output (e.g., a graphic, a flash of light, a sound, a somatosensory response, a haptic response, etc.) with computing device 10.

Notification client module 22 may perform functions associated with receiving, managing, outputting, and otherwise handling at least a portion of the notification data generated and/or received by platforms, applications, and services executing at computing device 10. Notification client module 22 may receive notification data from notification host module 62 of information server system 60 and output the received notification data to a recipient platform, application, and/or service executing at computing device 10. Notification client module 22 may receive notification data generated by a platform, application, and/or service executing at computing device 10, and output the received notification data to information server system 60 over links 32. Notification client module 22 also may cause UI module 20 to output alerts (e.g., visual alerts at UID 12 and/or somatosensory alerts using SOD 14) to indicate the receipt of notification data by computing device 10. Said differently, notification client module 22 may cause UI module 20 to output alerts as indications of notification data.

As used throughout the disclosure, the term "notification data" is used to describe various types of information that may indicate the occurrence of an event associated with various platforms, applications, and services executing within an execution environment at one or more computing devices, such as computing device 10. For example, notification data may include, but is not limited to, information regarding an event such as: the receipt of a communication message (e.g., e-mail, instant message, SMS, etc.) by a messaging account associated with a user of computing device 10, the receipt of information by a social networking account associated with a user of computing device 10, a reminder of a calendar event (meetings, appointments, etc.) associated with a calendar account of a user of computing device 10, information generated and/or received by a third-party application executing at computing device 10, the transmittal and/or receipt of inter-component communications between two or more components of platforms, applications, and/or services executing at computing device 10, etc.

Context module 24 may receive and aggregate contextual information related to a user of computing device 10. Based on the contextual information, context module 24 may infer a physiological condition of the user at a particular (e.g., current) time and/or a type of activity associated with the user at the particular (e.g., current) time. Context module 24 may output information to UI module 20 that indicates whether context module 24 predicts, infers, or otherwise determines that a user is stressed, relaxed, or neither stressed nor relaxed at a current time, based on the contextual information received by context module. Context module 24 may output information to UI module 20 that indicates whether context module 24 predicts, infers, or otherwise determines that a user is performing a physical activity, a non-physical activity, a focus intensive activity, and/or a non-focus intensive activity, at a current time.

As used throughout the disclosure, the term "contextual information" is used to describe information that can be used by a computing system, a computing device, or a component or module thereof, such as context module 24 of computing device 10, to determine a physiological condition of a user (e.g., whether a user is stressed or not stressed) and/or a type of activity (e.g., physical, non-physical, stressful, not stressful, focus-intensive, non-focus-intensive) associated with a user of a computing device at a particular time. For example, contextual information may include data specifying a location and/or a degree of movement associated with one or more computing devices, such as computing device 10, and/or data specifying a measured value of a physiological parameter associated with a user of one or more computing devices, such as a user of computing device 10, and/or data specifying a currently active application being executed by computing device 10. Contextual information may include data specifying a type of application, exercise, game, etc. being performed by a user of a computing device, such as computing device 10, at a particular time. Contextual information may specify a time of day (e.g., an hour of a day, lunch time, breakfast time, dinner time, bedtime, wakeup time, break time, work hours, non-work hours, etc.).

SOD 14 includes one or more components or output devices capable of providing various somatosensory type outputs. For example, rather than provide visual or audible types of output, SOD 14 may be configured to cause computing device 10 to provide a vibration type output, an electric stimulus type output, a shape-memory alloy type output, and/or another type of somatosensory type output. UI module 20 may control the type of somatosensory output that SOD 14 outputs by issuing commands to SOD 14 as UI module 20 manages the presentation of a user interface (e.g., a somatosensory type user interface) associated with computing device 10.

SOD 14 may include an electrically and/or mechanically controlled vibration device capable of vibrating attachment device 16 and/or housing 18 of computing device 10 with various degrees of intensity. UI module 20 may cause SOD 14 to output vibrations with varying degrees of intensity. The intensity of the vibrations may be affected by the amplitude, frequency, and/or pattern of the vibrations. For example, a vibration characterized by a signal having a greater amplitude (and the same frequency and pattern) may be perceived by a user as being more intense. As another example, vibrations characterized by signals having different frequencies and/or with different patterns (with the same amplitude) may be perceived by the user as having different intensities. UI module 20 may control at least one characteristic of the vibration caused by SOD 14 (e.g., including at least one of frequency, amplitude, pattern, duration, etc.) to control the vibration intensity.

For instance, UI module 20 may cause SOD 14 to output a high intensity vibration to cause housing 18 and/or attachment device 16 to shake with a greater force and/or higher frequency than when SOD 14 outputs a less intense vibration. SOD 14 may receive a command from UI module 20 that causes SOD 14 to output either a high intensity vibration, a low intensity vibration, or a moderate vibration with a level of intensity that is less than a high intensity vibration and greater than a low intensity vibration. For example, UI module 20 may cause SOD 14 to output a high intensity vibration as an indication of notification data (e.g., to indicate the receipt of notification data) when context module 24 determines that the user is likely stressed and/or physically active (e.g., jogging).

In some examples, SOD 14 may include shape-memory alloy ("SMA") that forms at least a portion of attachment device 16 or housing 18, SMA also may be referred to as "smart metal," "memory metal," "memory alloy," "muscle wire," and "smart alloy." SMA is an engineered material alloy that can change shape when exposed to changes in temperature (e.g., when heated and/or when cooled). SMA may define a first shape when at low temperatures and a second shape when heated to a higher (e.g., activation) temperature.

When SOD 14 includes a SMA, the SMA may define a first shape that results in housing 18 or attachment device 16 fitting relatively loosely on or around an appendage (e.g., head, wrist, hand, etc.) of a user of computing device 10. An electrical conductor that carries an electrical current may be disposed adjacent to or within the SMA of SOD 14, UI module 20 may control SOD 14 to cause an electrical current to conduct through the electrical conductor of the SMA. By controlling SOI) 14, UI module 20 may control the temperature of the SMA of SOD 14 (e.g., by controlling an electrical current through an electrical conductor adjacent to or passing through the SMA) to control the shape of the SMA of SOD 14 and cause computing device 10 to provide a shape-memory alloy type output or alert to a user of computing device 10. For example SOD 14 may receive a command from UI module 20 for causing SOD 14 to output a SMA type alert indicative of the receipt of notification data. In response to the command to output the SMA type alert, SOD 14 may apply a current through a conductor of a portion of the SMA of SOI) 14 to increase the internal temperature of the SMA of SOD 14 beyond an activation temperature associated with the SMA. In some examples, the activation temperature may be greater than the user's body temperature, such that the SMA is not activated by being disposed adjacent to the user's body. At or above the activation temperature, the shape of the SMA may change to a second shape (e.g., deform) and exert pressure against the user's wrist (e.g., tighten around the user's wrist) as the shape of housing 18 and/or attachment device 16 changes under influence of the SMA. In response to a command from UI module 20, SOD 14 may cause an electrical current to stop conducting through the electrical conductor of the SMA. When the electrical current stops passing through the electrical conductor, the temperature of the SMA may cool back below the activation temperature and the SMA may revert to the first shape, which may cause the shape of housing 18 or attachment device 16 to revert (e.g., such that housing 18 and/or attachment device 16 again fits relatively loosely again around the wrist of the user). A user of computing device 10 may perceive (e.g., feel) a change to a shape or size of housing 18 and/or attachment device 16 as a somatosensory type alert indicative of the receipt of notification data.

SOD 14 also may include an electrical circuit configured to generate an electrical stimulus-type alert. UI module 20 may control SOD 14 to provide the electrical stimulus-type of alert based on and/or responsive to notification client module 22 receiving notification data. For example, a portion of housing 18 or attachment device 16 may include one or more electrical contacts coupled to SOD 14. When a user of computing device 10 wears computing device 10, the one or more electrical contacts may contact the user's body (e.g., skin on a wrist of the user). SOD 14 may receive a command from UI module 20 to produce an electrical stimulus-type of alert to cue the user to the receipt of notification data. In response to the command from UI module 20, SOD 14 may apply an electrical current at the one or more electrical contacts to cause the user to perceive or feel an electrical stimulus proximate to the one or more electrical contacts.

UI module 20 may cause UID 12 and SOD 14 to output, respectively, visual and somatosensory alerts based on notification data. For example, UI module 20 may cause UID 12 to output a graphical user interface for display from which a user can view output and provide input at UID 12. UI module 20 may cause UID 12 to output a graphical indication as a visual type alert within the user interface as an indication of notification data (e.g., to indicate the receipt of notification data).

UI module 20 also may cause SOD 14 to output a somatosensory user interface. In other words, a somatosensory user interface may be defined as a user interface at which a user can feel, rather than hear or view, output from a computing device, such as computing device 10, as the computing device conveys information to the user. UI module 20 may cause SOD 14 to output a somatosensory alert to output as an indication of notification data. (e.g., to indicate the receipt of notification data) as part of the somatosensory user interface controlled by UI module 20. As a user of computing device 10 feels somatosensory output from SOD 14, the user may interact with computing device 10 by providing input at computing device 10 (e.g., at UID 12, a microphone, or other input device of computing device 10).

For instance, UI module 20 may receive information from notification client module 22 to cause UI module 20 to output a somatosensory of alert, using SOD 14, based on notification data received by computing device 10. UI module 20 may query context module 24 for information related to an inferred physiological condition and/or activity associated with the user at a current time. UI module 20 may select a type of somatosensory alert to output using SOD 14 depending on the interred physiological condition and/or a type of activity associated with the user. UI module 20 may issue a command or instruction to SOD 14 that causes SOD 14 to produce a output of the somatosensory type that corresponds to the physiological condition and/or activity associated with the user at the current time In some examples, contextual information may include sensor information obtained by one or more sensors (e.g., gyroscopes, accelerometers, proximity sensors, temperature sensors, galvanic skin response sensors, hear rate sensors, inferred pulse sensors, etc.) of computing device 10 or communicatively coupled to computing device 10, radio transmission information obtained from one or more communication units and/or radios (e.g., global positioning system (UPS), cellular, etc.) of computing device 10 or communicatively coupled to computing device 10, information obtained by one or more input devices (e.g., cameras, microphones, keyboards, touchpads, mice, UID 12, etc.) of computing device 10 or communicatively coupled to computing device 10, network/device identifier information (e.g., a network name, a device Internet protocol address, etc.), information obtained from one or more processors of computing device 10 (e.g., a currently, active application, etc.). In some examples, contextual information related to a user may include communications information, such as e-mail messages, text-based (e.g., SMS) messages, telephone phone messages, calendar entries associated with the user, social network profile and communication information associated with the user, etc. In some examples, contextual information related to a user may include traffic conditions at or near a location of a computing device associated with the user, weather conditions at or near a location of a computing device associated with the user, ambient audio data collected at or near a location of a computing device associated with the user, video or still imagery data collected at or near a location of a computing device associated with the user, and any other type of information related to a user of a computing device, such as computing device 10.

In some examples, context module 24 may obtain contextual information related to a user of computing device 10 in substantially real-time. In some examples, context module 24 may obtain contextual information related to the user of computing device 10 periodically (e.g., repeatedly with a defined period) or aperiodically (e.g., responsive to computing device 10 receiving notification data from information server system 60). In some examples, context module 24 may receive contextual information related to a user of computing device 10 at various earlier times and use the earlier information to learn and/or produce rules for discerning whether a user of computing device 10 is stressed, relaxed, and/or neither stressed nor relaxed, at a later time, and/or for discerning whether a user of computing device 10 is performing a physical activity, whether the user of computing device 10 is not performing a physical activity, whether the user is performing a focus-intensive activity, and/or whether the user is performing a non-focus intensive activity, at a later tune.

In some examples, context module 24 may determine a physiological condition of the user of computing device 10 at a current time based on contextual information obtained by computing device 10 prior to or at the current time. For instance, context module 24 may determine a measured value associated with a physiological parameter of the user and, based on the physiological parameter value, may infer a physiological condition of the user. In some examples, the physiological parameter value may relate to a heart rate of a user, a galvanic skin response of a user's skin, a body temperature of a user, etc. Based on one or more of these physiological parameters, context module 24 may infer a physiological condition of the user, for instance, whether a user is stressed, relaxed, or at a baseline level indicating that the user is neither particularly relaxed nor stressed at a particular time.

For example, context module 24 may utilize one or more thresholds for determining whether a user is stressed or relaxed at a current time based on one or more physiological parameter values. Context module 24 may, for example, compare a heart rate and/or temperature and/or galvanic skin response level of a user to a heart rate threshold and/or temperature threshold and/or galvanic skin response level threshold, respectively, and, if the heart rate and/or temperature and/or galvanic skin response level exceeds the corresponding threshold, context module 24 may determine that the user is stressed. Conversely, responsive to determining that the heart rate and/or temperature and/or galvanic skin response level of the user does not exceed the corresponding threshold, context module 24 may determine that the user is not stressed.

In some examples, context module 24 may utilize two or more thresholds for determining whether a user is stressed, relaxed, or neither stressed nor relaxed at a current time based on one or more physiological parameters. For example, a first threshold may correspond to a maximum physiological parameter value (e.g., heart rate and/or temperature and/or galvanic skin response level) of a user in a relaxed state and a second, different threshold may correspond to a minimum physiological parameter value of a user in a stressed state. The second threshold may be greater than the first threshold. Context module 24 may determine that a user is stressed when the user has a physiological parameter value that is above the second threshold, that the user is stressed when the user has a physiological parameter value that is below the first threshold, or that the user is neither stressed nor relaxed when the user has a physiological parameter value that falls between the first and second threshold values for that physiological parameter (e.g., has a nominal physiological parameter).

In some examples, context module 24 may output data indicative of whether a user of computing device 10 is likely currently stressed, relaxed, or neither stressed nor relaxed to UI module 20 for use by UI module 20 in selecting a type of somatosensory alert to output as an indication of notification data (e.g., to indicate the receipt of notification data).

In some examples, context module 24 may additionally or alternatively infer a type of activity (e.g., physical, non-physical, focus-intensive, non-focus intensive, etc.) associated with the user at a particular time based on contextual information obtained by computing device 10. For instance, context module 24 may determine a rate of movement of computing device 10 (e.g., acceleration, velocity, speed, direction, etc.) and/or a location of computing device 10 (e.g., a coordinate location, a relative location, a location on a map, etc.) and infer, based on the location and rate of movement of computing device 10, whether the user of computing device 10 is performing a physical or non-physical activity at a particular time.

For example, context module 24 of computing device 10 may obtain contextual information that computing device 10 receives using from various communication units, input devices, sensors, and the like of computing device 10 and may determine a location associated with computing device 10. Context module 24 may receive GPS, cellular, and/or Wi-Fi data received over link 32A by computing device 10 and determine coordinate locations of computing device 10 based on the data. In some examples, context module 24 may determine a relative location (e.g., an address, a place, a country, a city, a type of building, a business, etc.) of computing device 10 and/or determine a location of computing device 10 based on signal triangulation (e.g., a technique for determining a single location based on relative position data received from two or more signals). In other examples, context module 24 may determine a location of computing device 10 based on a network identifier associated with computing device 10.

Context module 24 may determine a degree of movement associated with computing device 10, at a location, based on contextual information. For example, context module 24 may determine a velocity, acceleration, speed, direction, and/or orientation of computing device 10 based on sensor data obtained by computing device 10 and/or based on location data associated with computing device 10. In some examples, context module 24 may track the location of computing device 10 over time and determine velocity, direction, speed; and/or acceleration of computing device 10 based on changes in the locations of computing device 10, Based on the location and/or movement associated with computing device 10; context module 24 may infer whether the user of computing device 10 is performing a physical or non-physical activity. For example, if the location of computing device 10 corresponds to a location on a highway and the rate of movement corresponds to a rate of travel for a moving vehicle, context module 24 may determine that the user is likely driving or riding in a vehicle and not performing a physical activity. However, if the rate of movement corresponds to a rate of travel for a person who is walking, jogging, or riding a bicycle, context module 24 may determine that the user is performing a physical activity at the particular time.

In some examples, context module 24 may determine that a user of computing device 10 is performing a physical activity if context module 24 infers from accelerometer data and/or gyroscope data that the rate of movement and orientation of computing device 10 over time corresponds to a rate of movement and/or orientation of a computing device when a user is walking, jogging, swimming, or bicycling. In some examples, context module 24 may further determine whether a user is performing a physical activity if a heart rate inferred from the contextual information is higher than a baseline heart rate and or if the heart rate corresponds to a heart rate of a user that is exercising.

In some examples, context module 24 may determine that a user of computing device 10 is performing a non-physical activity if context module 24 inters from accelerometer data and/or gyroscope data that the rate of movement and orientation of computing device 10 over time corresponds to a rate of movement and/or orientation of a computing device when a user is sitting, lying down, etc. In some examples, context module 24 may additionally or alternatively determine whether a user is performing a non-physical activity if a heart rate inferred from the contextual information is lower than a baseline heart rate (e.g., a heart rate at rest) and or if the heart rate corresponds to a heart rate of a user that is at rest.

In any event, in some examples, based on contextual information, context module 24 may determine a likelihood (e.g., a probability) of whether a user associated with computing device 10 is performing a physical activity or a non-physical activity, at a particular time. Context module 24 may use machine learning and/or other prediction algorithms and techniques to determine a probability, based on the contextual information, that a user of computing device 10 is performing a physical activity or not, at a particular (e.g., current) time. In other words, context module 24 may provide contextual information as one or more signal inputs to a machine learning algorithm and receive as output, a probability indicating whether a user of computing device 10 is performing a physical activity or a non-physical activity, a particular time. Context module 24 may output data indicative of whether a user of computing device 10 is likely performing a physical activity or a non-physical activity to UI module 20 for use by UI module 20 in selecting a type of somatosensory type alert which to output as an indication of notification data (e.g., to indicate the receipt of notification data).

In some examples, based on contextual information, context module 24 may determine a likelihood of whether a user associated with computing device 10 is performing a stressful activity or a non-stressful activity at a current time. For example, context module 24 may infer that if a user is performing a physical activity (e.g., exercising) that the user is likely stressed.

Context module 24 may determine, based on contextual information, a likelihood of whether a user associated with computing device 10 is stressed or not when performing a non-physical activity by, for example, determining, based on the contextual information, a type of application executing at computing device 10 at the current time. Context module 24 may infer that if the user is interacting with a particular application (e.g., a game application) executing at computing device 10, that the user is stressed. Said differently, context module 24 may infer that the user is performing a focus-intensive, non-physical activity, and therefore stressed, based on a determination that the user is interacting with a particular application. Context module 24 may infer that if the user is interacting with a different application (e.g., a reading application) executing at computing device 10, that the user is relaxed. Said differently, context module 24 may infer that the user is performing a non-focus-intensive, non-physical activity, and therefore relaxed, based on a determination that the user is interacting with different application.

In some examples, context module 24 may evaluate additional contextual information to determine a whether the user is stressed when context module 24 determines that the user is performing a non-physical activity at the current time. For example, context module 24 may determine that the user is likely to be stressed if the context module 24 determines that the user is currently engaging in one of a first predetermined set of activities and/or may determine that the user is likely to be relaxed if the context module 24 determines that the user is currently engaging in one of a second predetermined set of activities. For example, context module 24 may determine that the user is likely stressed, and therefore, not relaxed, when context module 24 determines, based on contextual information, that the user is driving an automobile. Context module 24 may determine that the user is likely relaxed when context module determines, based on contextual information, that the user may be performing the non-physical activity of taking public transportation or reading a book.

Computing device 10 and information server system 60 may only collect or make use of information associated with a user of computing device 10 (e.g., notification data, contextual information, etc.) after providing the user with an opportunity to provide input at computing device 10 to control whether programs or features of information server system 60 and computing device 10 can collect and make use of user information (e.g., information about a user's current location, current speed, etc.), or to dictate whether and/or how information server system 60 and computing device 10 may receive content that may be relevant to the user. In addition, certain data may be treated in one or more ways before it is stored or used by information server system 60 and computing device 10, so that personally-identifiable information is removed.

In operation, information server system 60 may receive notification data associated with a user of computing device 10, e.g., from a content server associated with one or more accounts associated with the user of computing device 10. Notification host module 62 may output the notification data over network link 32N to network 30. Notification client module 22 of computing device 10 may receive the notification data from network 30 via network link 32A.

Notification client module 22 may output a command or instruction to UI module 20 to cause UI module 20 to output an alert indicative of the receipt of the notification data UI module 20 may query context module 24 for information that UI module 20 can use to determine which type of somatosensory type of alert to output using SOD 14.

Context module 24 of computing device 10 may receive contextual information related to a user associated with computing device 10. As described above, the contextual information may relate to at least one of a physiological condition of the user at a current time or a type of activity associated with the user at the current time. In some examples, context module 24 may determine whether a user is stressed, relaxed, or neither stressed nor relaxed, at the current time, based on the contextual information. In some examples, context module 24 may determine whether a user is performing a physical activity, a non-physical activity, a focus intensive non-physical activity, and/or a non-focus intensive non-physical activity, at the current time, based on the contextual information. Context module 24 may send UI module 20 data indicative of the determination made as to whether the user is performing a physical activity, a non-physical activity, a focus-intensive activity, a non-focus intensive activity, and/or a physiological condition associated with the user (e.g., stressed, relaxed, or neither stressed nor relaxed) at the current time.

UI module 20 may select a type of somatosensory alert with which to indicate receipt of notification data based on the data from context module 24. The type of alert that UI module 20 selects may include at least one of an electric stimulus type alert, a shape-memory alloy type alert, and a vibration type alert. For example, UI module 20 may receive the data from context module 24 indicating that the user of computing device 10 is stressed and/or physically active at the current time. UI module 20 may select a more intense somatosensory type alert (e.g., an electric stimulus), to alert the user of computing device 10 as to the receipt of the notification data rather than a less intense somatosensory type alert (e.g., a mild vibration) when UI module 20 receives data from context module 24 indicating that the user is likely stressed or physically active. UI module 20 may output a command or instruction to SOD 14 to cause SOD 14 to output an electric stimulus type somatosensory alert.

As another example, UI module 20 may receive the data from context module 24 indicating that the user of computing device 10 is relaxed and/or physically inactive at the current time. UI module 20 may select a less intense (e.g., more subtle) somatosensory type alert (e.g., an SMA type alert), which may be effective in alerting the user of computing device 10 as to the receipt of the notification data, while being less intrusive than a more intense somatosensory type alert (e.g., an intense vibration), since the user is likely relaxed and/or physically inactive. UI module 20 may output a command or instruction to SOD 14 to cause SOD 14 to output an electric stimulus type somatosensory alert.

Responsive to the command or instruction from UI module 20, SOD 14 may output, at the current time, an alert based on the notification data, the alert being of the selected type of alert. For example, SOD 14 may output an electric stimulus type alert to convey information to the user of computing device 10 that indicates notification data was received by computing device 10 at the current time.

In this manner, computing device 10 may select a way in which the computing device 10 outputs somatosensory alerts based at least in part on the physiological condition and/or activity associated with the user at a current time. By selecting a type of somatosensory alert based on contextual information related to a user in this way, computing device 10 may increase a likelihood that the user of the computing device perceives (e.g., feels) an alert being outputted by the computing device, while reducing distraction, disturbance, or annoyance to the user with the output of the alert. For example, the user may be less likely to miss an alert based on notification data and computing device 10 may in turn output fewer subsequent alerts to convey the same information conveyed by a prior alert. As another example, the somatosensory alert may be better tailored to the current circumstances, such that the somatosensory alert is less likely to be more intense than necessary to alert the user to the receipt of notification data. Furthermore, computing device 10 may receive fewer inputs from a user to turn-off or disable alerts from the computing device 10 since the user may find these types of alerts to be more appealing than other types of alerts. By outputting fewer subsequent alerts and by receiving fewer inputs from the user, computing device 10 may perform fewer operations and consume less electrical power.

Throughout the disclosure, examples are described where a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 2:
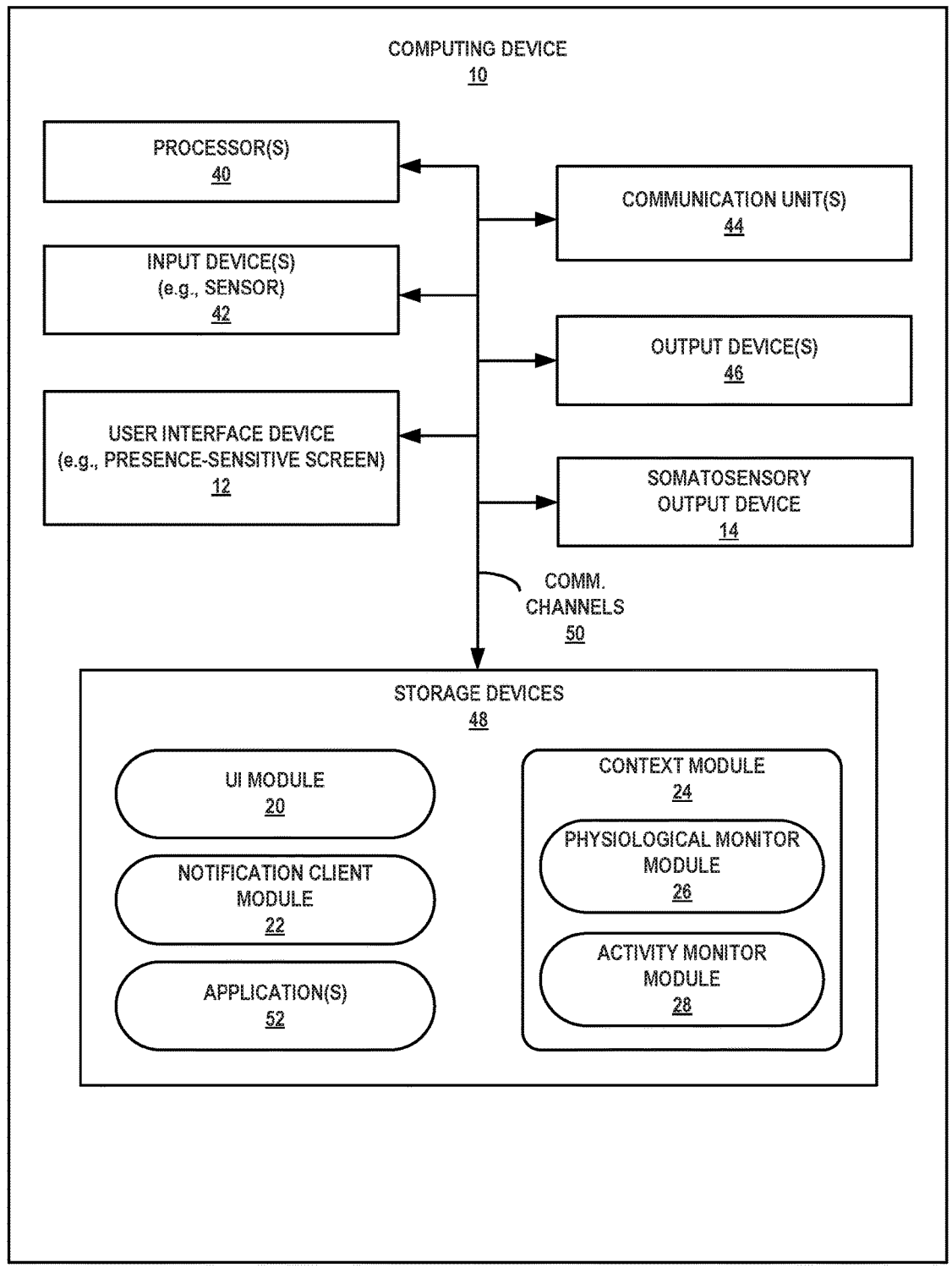
FIG. 2 is a block diagram illustrating an example computing device configured to output alerts based on notification data, in accordance with one or more aspects of the present disclosure.

FIG. 2 is a block diagram illustrating an example computing device configured to output alerts based on notification data, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes UID 12, SOD 14, one or more processors 40, one or more input devices 42, one or more communication units 44, one or more output devices 46, and one or more storage devices 48. In the illustrated example, storage devices 48 of computing device 10 also include UI module 20, notification client module 22, context module 24, and one or more applications 52. Context module 24 includes physiological monitor module 26 ("PM module 26") and activity, monitor module 28 ("AM module 28"). Communication channels 50 may interconnect each of the components 12, 14, 20, 22, 24, 26, 28, 40, 42, 44, 46, and 52 for inter-component communications (physically, communicatively, and/or operatively). In some examples, communication channels 50 may include a system bus, a network connection, an inter-process communication data structure, or any other method for communicating data, One or more input devices 42 of computing device 10 may receive input. Examples of input are tactile, audio, video, and sensor input. Input devices 42 of computing device 10, in some examples, include a presence-sensitive input device (e.g., a touch sensitive screen, a presence-sensitive display), mouse, keyboard, voice responsive system, video camera, microphone, or any other type of device for detecting input from a human or machine. In some examples, input devices 42 include physiological sensors for obtaining physiological parameter information associated with a user of computing device 10 For example, input devices 42 may include a heart monitor sensor, a temperature sensor, a galvanic skin response sensor, an accelerometer, a gyroscope, a pressure sensor, a blood pressure sensor, and/or any other sensor for measuring a physiological parameter that computing device 10 may use for determining a physiological condition of a user.

One or more output devices 46 of computing device 10 may generate output. Examples of output are tactile, audio, and video output. Output devices 46 of computing device 10, in some examples, include a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may he or may include a presence-sensitive input device. In some examples, a presence-sensitive input device may detect an object at and/or near the presence-sensitive input device. As one example range, a presence-sensitive input device may detect an object, such as a finger or stylus that is within two inches or less of the presence-sensitive input device. In another example range, a presence-sensitive input device may detect an object six inches or less from the presence-sensitive input device, and other ranges are also possible. The presence-sensitive input device may determine a location (e.g., an (x,y) coordinate) of the presence-sensitive input device at which the object was detected. The presence-sensitive input device may determine the location selected by the input device using capacitive, inductive, and/or optical recognition techniques. In some examples, presence-sensitive input device provides output to a user using tactile, audio, or video stimuli as described with respect to output device 46, and may be referred to as a presence-sensitive display.

While illustrated as an internal component of computing device 10, UID 12 also represents an external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone or wearable computing device). In another example, UID 12 represents an external component of computing device 10 located outside and physically separated from the packaging of computing device 10 (e.g., a monitor, a projector, etc. that shares a wired and/or wireless data path with computing device 10).

In some examples, SOD 14 of computing device 10 may include functionality of output devices 46. In the example of FIG. 2, SOD 14 may output a somatosensory alert, cue, or indication. For example, SOD 14 may output an electric stimulus type alert, a vibration type alert, and/or a SMA type alert in response to a command received from UI module 20.

One or more storage devices 48 within computing device 10 may store information for processing during operation of computing device 10. In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than a temporary memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories, Storage devices 48 may store program instructions and/or data associated with UI module 20, notification client module 22, context module 24, PM module 26, AM module 28, and one or more applications 52.

One or more processors 40 may implement functionality and/or execute instructions within computing device 10. For example, processors 40 on computing device 10 may receive and execute instructions stored by storage devices 48 that execute the functionality of UI module 20, notification client module 22, context module 24, PM module 26, AM module 28, and/or one or more applications 52. These instructions executed by processors 40 may cause computing device 10 to store information within storage devices 48 during program execution. Processors 40 may execute instructions of modules 20-28 and 52 to cause SOD 14 to output one or more somatosensory type alerts based on notification data received by computing device 10. That is, modules 20-28 and 52 may be operable by processors 40 to perform various actions, including outputting information associated with a somatosensory type user interface using SOD 14.

In accordance with aspects of this disclosure, context module 24 of computing device 10 may receive contextual information related to a user associated with computing device 10. PM module 26 and/or AM module 28 may use the contextual information to determine a type of activity being performed by the user at the current time (e.g., the time at which notification client module 22 received the notification data) and/or a physiological condition of the user of computing device 10 at the current time.

PM module 26 may infer a physiological condition of a user of computing device 10 based on contextual information that context module 24 receives at a current time. PM module 26 may include one or more machine learning algorithms or systems based on rules for determining a physiological condition (e.g., whether a person is stressed, relaxed, not stressed nor relaxed) of a user at a current time. The rules or algorithms of PM module 26 may receive physiological parameter information from input devices 42 and based on the physiological parameter information, infer, determine or otherwise predict whether, at a current time, a user of computing device 1eis relaxed, stressed, or neither stressed nor relaxed, For example, PM module 26 may receive physiological data (e.g., heart rate information, temperature information, blood pressure information, galvanic skin response level information, etc.) over communication channels 50 from one or more input devices 42 (e.g., a physiological sensor), and compare the physiological data to one or more thresholds for determining whether a user of computing device 10 is stressed, relaxed, or neither stressed nor relaxed at a current time. Context module 24 may output data to UI module 20 indicative of a physiological condition of a user of computing device 10.

AM module 28 may infer a type of activity associated with a user of computing device 10 at a current time. AM module 28 may determine whether a type of activity associated with a user of computing device 10 is a physical or a non-physical type of activity. In some examples, if AM module 28 determines that the activity associated with the user at the current time is a non-physical activity, AM module 28 may determine whether the non-physical activity is a stressful or a non-stressful type of non-physical activity. Context module 24 may output data to UI module 20 indicative of a physical activity associated with a user of computing device 10 at a current time.

For example, AM module 28 may include one or more machine learning algorithms or systems based on rules for determining a type of activity associated with a user at a current time. The rules or algorithms of AM module 28 may receive contextual information from input devices 42, communication units 44, applications 52, and/or other sources of contextual information related to a user of computing device 10. Based on the contextual information, the rules or algorithms of AM module 28 may infer, determine or otherwise predict whether, at a current time, a user of computing device 10 is performing a physical type of activity, performing a non-physical type of activity, performing an intense or stressful non-physical type of activity, and/or performing a not intense or relaxing type of non-physical activity.

In some examples, AM module 28 of context module 24 may receive information from one or more applications 52 indicating a type of an active application executing at computing device 10 at the current time. AM module 28 may determine that when a first type of application is active (e.g., a game application, a work-related application, an educational or test taking application, etc.) that the type of activity being performed by the user and associated with the user at the current time is a non-physical, stressful type of activity. AM module 28 may determine that when a different type of application is active (e.g., a reading application, an internet browsing application, a magazine application, a music application, a movie application, etc.) that the type of activity being performed by the user and associated with the user at the current time is a non-physical, not stressful (e.g., relaxing) type of activity.

In some examples, AM module 28 of context module 24 may receive information from communication units 44 and/or input devices 42 and determine a location, speed, velocity, acceleration, orientation, etc. of computing device 10 at the current time, and, based on the location, speed, velocity, acceleration, orientation etc., determine whether or not the user of computing device 10 is performing a physical or non-physical activity. For example, orientation data received from a gyroscope of input devices 42 may indicate to AM module 28 that the user is holding computing device 10 upside down in a way that may indicate a user is lying down while viewing UID 12, AM module 28 may infer that when the user is lying down in this way that the user of computing device 10 is performing a non-physical activity that is also not stressful. AM module 28 may receive information from communication units 44 indicating that the user is traveling at a speed associated with bicycle travel and further receive accelerometer data from input devices 42 indicating an amount of vibration being detected at the current time. Based on the speed and vibration determined by AM module 28, a machine learning algorithm of AM module 28 may determine that the user is likely performing the physical activity of riding a bicycle at the current time.

After determining a physiological condition of the user at a current time and/or a type of activity associated with the user at the current time, context module 24 may output data over communication channels 50 to UI module 20 that indicates a type of activity being performed by the user at the current time and/or a physiological condition of the user at the current time. Using the data that context module 24 generates based on contextual information related to a user, UI module 20 may select a type of alert with which to indicate receipt of the notification data. The type of alert includes at least one of an electric stimulus type alert, a shape-memory alloy type alert, and a vibration type alert.

For example, UI module 20 may compare the data received from context module 24 to one or more rules for selecting a somatosensory type of alert based on a physiological condition of the user. In some examples, if the data from context module 24 indicates that the user may be experiencing a stressed physiological condition at the current time, UI module 20 may select an intense type of somatosensory alert (e.g., an electric stimulus). In some examples, if the data indicates that the user may be relaxed at the current time, UI module 20 may select a subtle (e.g., not intense) type of somatosensory alert (e.g., an SMA type alert). In some examples, if the data from context module 24 indicates that the user is likely experiencing neither a stressed nor a relaxed physiological condition at the current time, UI module 20 may select a default or baseline (e.g., not intense or not subtle) type of somatosensory alert (e.g., a medium intensity vibration).

UI module 20 may additionally or alternatively compare the data received from context module 24 to one or more rules for selecting a somatosensory type of alert based on a type of activity associated with the user at the current time. In some examples, if the data from context module 24 indicates that the user may be performing a physical activity, UI module 20 may infer that the user may be stressed and may select an intense type of somatosensory alert (e.g., an electric stimulus type alert). In some examples, if the data indicates that the user may be performing a non-stressful, non-physical (e.g., relaxing) type of activity at the current time, UI module 20 may select a subtle (e.g., not intense) type of somatosensory alert (e.g., an SMA type alert). In some examples, if the data from context module 24 indicates that the user is likely performing a non-physical, but potentially stressful activity at the current time (e.g., playing a gaming application), UI module 20 may select a more intense type of somatosensory alert (e.g., a high intensity vibration) than the type of alert selected when the user is likely performing a non-physical, non-stressful activity.

UI module 20 may output a command over communication channels 50 to cause SOD 14 to output the selected type of alert. SOD 14 may receive the command and in response, output an alert based on the notification data, the alert being of the selected type of alert.

In this manner, computing device 10 may select a way in which the computing device 10 outputs somatosensory alerts based at least in part on the physiological condition and/or activity associated with the user at a current time. By selecting a type of somatosensory alert based on contextual information related to a user in this way, computing device 10 may increase a likelihood that the user of the computing device perceives (e.g., feels) an alert being outputted by the computing device, while reducing distraction, disturbance, or annoyance to the user with the output of the alert. For example, the user may be less likely to miss an alert based on notification data and computing device 10 may in turn output fewer subsequent alerts to convey the same information conveyed by a prior alert. As another example, the somatosensory alert may be better tailored to the current circumstances, such that the somatosensory alert is less likely to be more intense than necessary to alert the user to the receipt of notification data. Furthermore, computing device 10 may receive fewer inputs from a user to turn-off or disable alerts from the computing device 10 since the user may find these types of alerts to be more appealing than other types of alerts. By outputting fewer subsequent alerts and by receiving fewer inputs from the user, computing device 10 may perform fewer operations and consume less electrical power.

Figure 3:
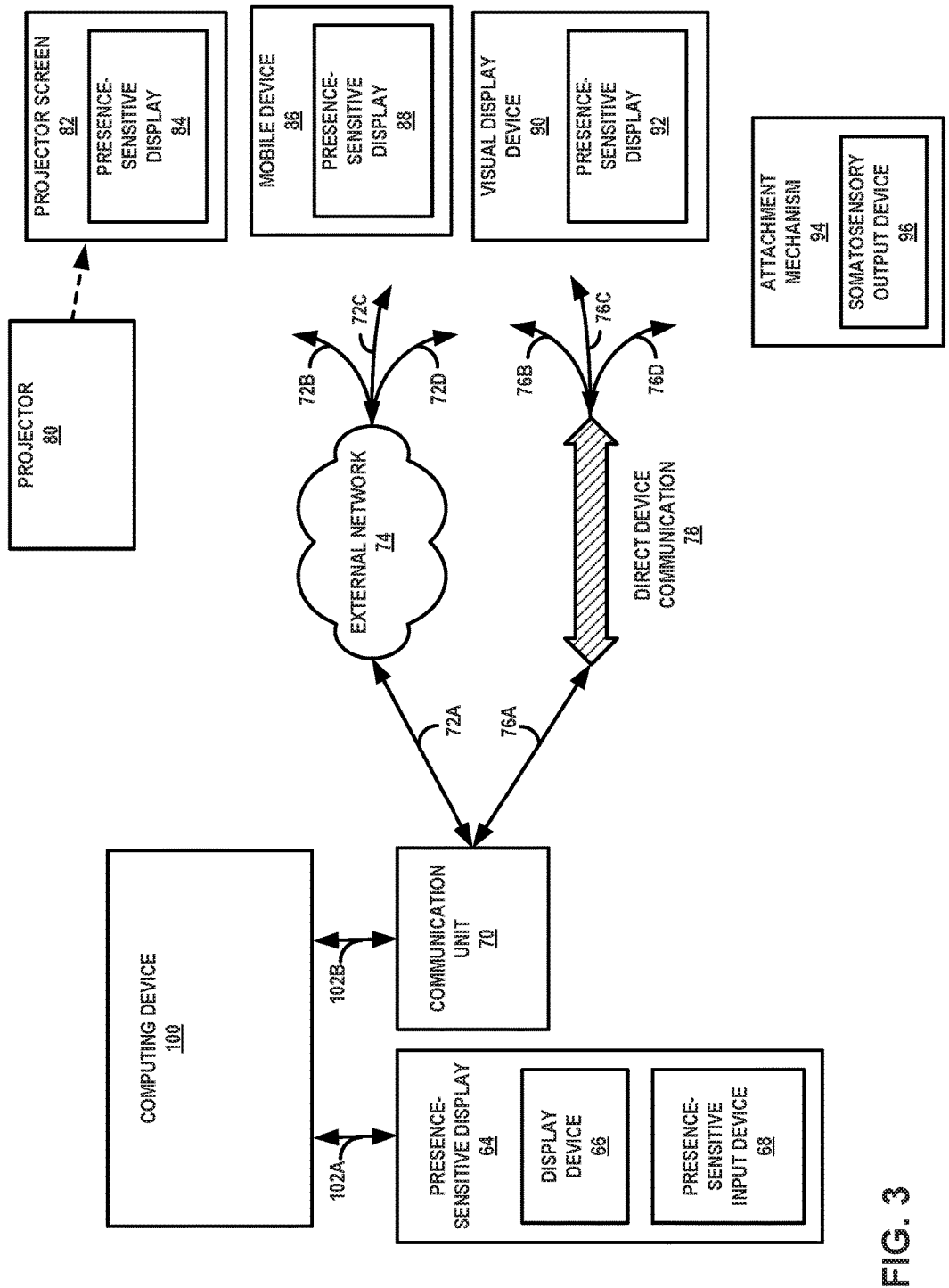
FIG. 3 is a conceptual block diagram illustrating an example computing device that outputs graphical content for display at a remote device and can output somatosensory type alerts at a remote attachment mechanism, in accordance with one or more techniques of the present disclosure.

FIG. 3 is a conceptual block diagram illustrating an example computing device that outputs graphical content for display at a remote device and can output somatosensory type alerts at a remote attachment mechanism, in accordance with one or more techniques of the present disclosure.

FIG. 3 is a block diagram illustrating an example computing device (e.g., computing device 10 of FIG. 1 and/or one or more processors 40 of FIG. 2) that outputs graphical content for display at a remote device and can receive indications of a state of a remote attachment mechanism, in accordance with one or more techniques of the present disclosure. Graphical content, generally, may include any visual information that may be output for display, such as text, images, a group of moving images, etc. The example shown in FIG. 3 includes a computing device 100, presence-sensitive display 64, communication unit 70, projector 80, projector screen 82, mobile device 86, visual display device 90, and attachment mechanism 94. Although shown for purposes of example in FIGS. 1 and 2 as a stand-alone computing device 10, a computing device such as computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processors 40 in FIG. 2. In such examples, computing device 100 may be operatively coupled to presence-sensitive display 64 by a communication channel 102A, which may be a system bus or other suitable connection. Computing device 100 may also be operatively coupled to communication unit 70, further described below by a communication channel 102B, which may also be a system bus or other suitable connection. Although shown separately as an example in FIG. 3, computing device 100 may be operatively coupled to presence-sensitive display 64 and communication unit 70 by any number of one or more communication channels.

Presence-sensitive display 64 may include display device 66 and presence-sensitive input device 68. Display device 66 may, for example, receive data from computing device 100 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 100 using communication channel 102A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 100 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth®, 3G, and Wi-Fi® radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other examples of projection devices may include electronic whiteboards, holographic display devices, and any other suitable devices for displaying graphical content. Projector 80 and projector screen 82 may include one or more communication units that enable the respective devices to communicate with computing device 100. In some examples, the one or more communication units may enable communication between projector 80 and projector screen 82. Projector 80 may receive data from computing device 100 that includes graphical content. Projector 80, in response to receiving the data, may project the graphical content onto projector screen 82. In some examples, projector 80 may determine one or more user inputs (e.g., continuous gestures, multi-touch gestures, single-touch gestures, double-bezel gestures, etc.) at projector screen using optical recognition or other suitable techniques and send indications of such user input using one or more communication units to computing device 100. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 22 as described in this disclosure. In some examples, presence-sensitive display 84 may include additional functionality. Projector screen 82 (e.g., an electronic whiteboard), may receive data from computing device 100 and display the graphical content. In some examples, presence-sensitive display 84 may determine one or more user inputs (e.g., continuous gestures, multi-touch gestures, single-touch gestures, double-bezel gestures, etc.) at projector screen 82 using capacitive, inductive, and/or optical recognition techniques and send indications of such user input using one or more communication units to computing device 100.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices. etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive display 92, for example, may receive data from computing device 100 and display the graphical content. In some examples, presence-sensitive display 92 may determine one or more user inputs (e.g., continuous gestures, multi-touch gestures, single-touch gestures, double-bezel gestures, etc.)at projector screen using capacitive, inductive, and/or optical recognition techniques and send indications of such user input using one or more communication units to computing device 100.

As described above, in some examples, computing device 100 may output graphical content for display at presence-sensitive display 64, which is coupled to computing device 100 by a system bus or other suitable communication channel. Computing device 100 may also output graphical content for display at one or more remote devices, such as projector 80, projector screen 82, mobile device 86, and visual display device 90. For instance, computing device 100 may execute one or more instructions to generate and/or modify graphical content in accordance with techniques of the present disclosure. Computing device 100 may output the data that includes the graphical content to a communication unit of computing device 100, such as communication unit 70. Communication unit 70 may send the data to one or more of the remote devices, such as projector 80, projector screen 82, mobile device 86, and/or visual display device 90. In this way, computing device 100 may output the graphical content for display at one or more of the remote devices. In some examples, one or more of the remote devices may output the graphical content at a display device, such as a presence-sensitive display, that is included in and/or operatively coupled to the respective remote device.

In some examples, computing device 100 may not output graphical content at presence-sensitive display 64 that is operatively coupled to computing device 100. In other examples, computing device 100 may output graphical content for display at both a presence-sensitive display 64 that is coupled to computing device 100 by communication channel 102A, and at a display of one or more the remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 64 may be different than graphical content display output for display at one or more remote devices, Computing device 100 may send and receive data using any suitable communication techniques. For example, computing device 100 may be operatively coupled to external network 74 using network link 72A. Each of the remote devices illustrated in FIG. 3 may be operatively coupled to network external network 74 by one of respective network links 72B, 72C, 72D, and 72E. External network 74 may include network hubs, network switches, network routers, etc., that are operatively inter-coupled thereby providing for the exchange of information between computing device 100 and the remote devices illustrated in FIG. 3. In some examples, network links 72A-72E may be Ethernet, ATM or other network connections. Such connections may be wireless and/or wired connections.

in some examples, computing device 100 may be operatively coupled to one or more of the remote devices included in FIG. 3 using direct device communication 78. Direct device communication 78 may include communications through which computing device 100 sends and receives data directly with a remote device, using wired or wireless communication. That is, in some examples of direct device communication 78, data sent by computing device 100 may not be forwarded by one or more additional devices before being received at the remote device, and vice-versa. Examples of direct device communication 78 may include Bluetooth®, Near-Field Communication, Universal Serial Bus, infrared, etc. One or more of the remote devices illustrated in FIG. 3 may be operatively coupled with computing device 100 by communication links 76A-76E. In some examples, communication links 76A-76E may be connections using Bluetooth®, Near-Field Communication, Universal Serial Bus, infrared, etc. Such connections may be wireless and/or wired connections.

In accordance with techniques of the disclosure, computing device 100 can be operable to output somatosensory type alerts indicative of the receipt of notification data at attachment mechanism 94. For example, as described with respect to FIGS. 1 and 2, computing device 100 may be or be part of a wearable computing device 10. Hence, computing device 100 may be mechanically coupled to an attachment mechanism, such as attachment mechanism 94 that may include a somatosensory output device (SOD) 96 (e.g., similar to SOD 14 of FIG. 1). In other examples, computing device 100 may be part of another, separate device from attachment mechanism 94. For example, computing device 100 can be part of a mobile computing device or a separate wearable computing device, or may be a mobile computing device or a separate wearable computing device.

In some examples, computing device 100 can receive notification data and output a graphical alert indicative of the receipt of the notification data, for instance, at presence-sensitive display device 64. In some examples, computing device 100 can determine a physical activity associated with a user of computing device 100 and/or a physiological condition of the user and select a somatosensory type of alert with which to cue or otherwise indicate to a user of computing device 100 to the receipt of the notification data. Computing device 100 can cause SOD 96 to output the selected type of somatosensory type of alert at attachment mechanism 94. In some examples, computing device 100 may be a mobile phone that infers a physical activity associated with a user and/or a physiological condition of the user and select a somatosensory type of alert with which to cue or otherwise indicate to a user of computing device 100 to the receipt of the notification data. Attachment mechanism 94 may be a watchband, bracelet, etc. including SOD 96 with which computing device 100 outputs the selected somatosensory type of alert.

Figure 4:
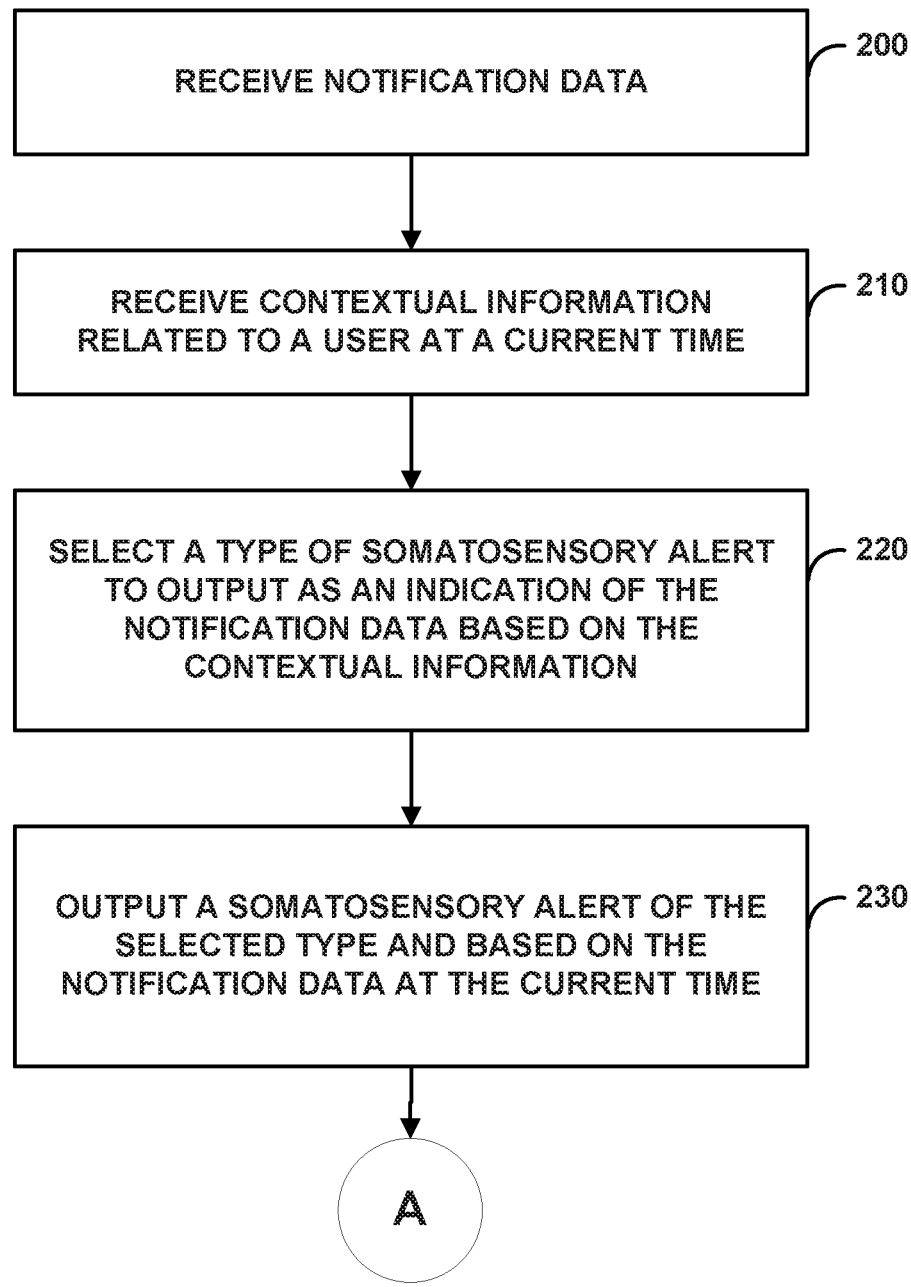
FIGS. 4 and 5 are flowcharts illustrating example operations of an example computing device configured to output alerts based at least in part on contextual information, in accordance with one or more aspects of the present disclosure.
Figure 5:
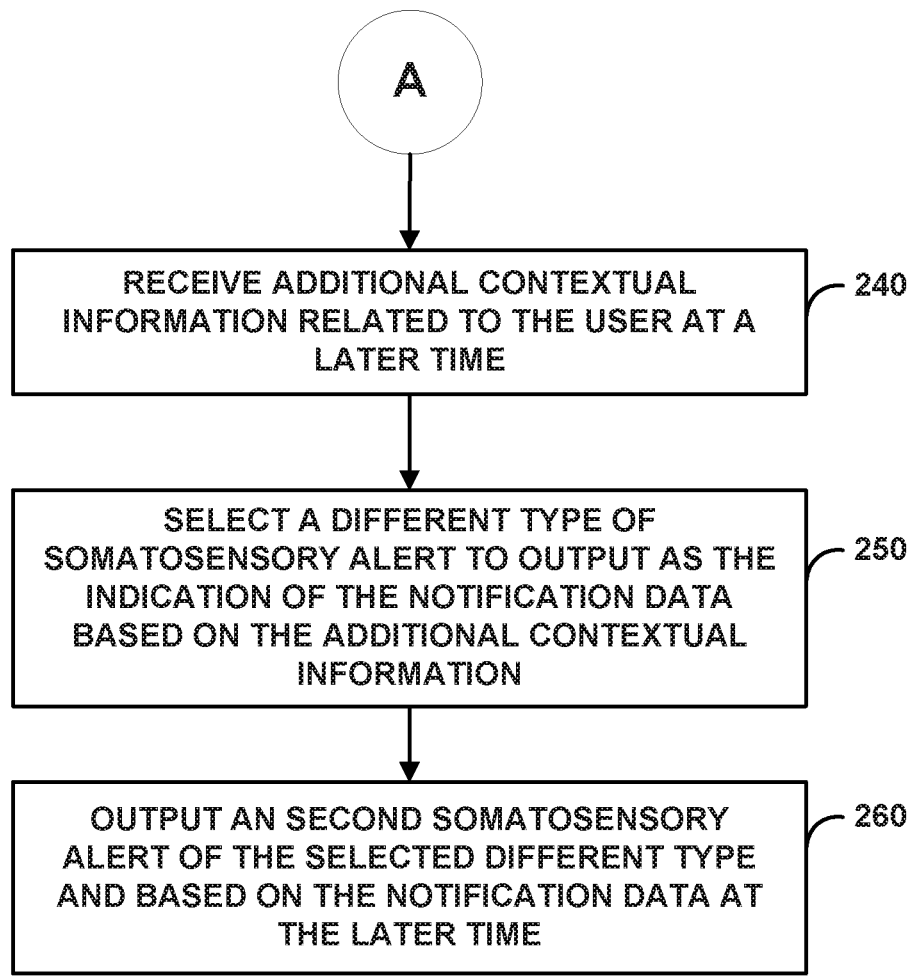

FIGS. 4 and 5 are flowcharts illustrating example operations of an example computing device configured to output alerts based at least in part on contextual information, in accordance with one or more aspects of the present disclosure. The processes of FIGS. 4 and 5 may be performed by one or more processors of a computing device, such as computing device 10 illustrated in FIG. 1 and FIG. 2. For purposes of illustration, FIGS. 4 and 5 are described below within the context of information server system 60, computing device 10, and system 1, illustrated in FIG. 1. Although the technique of FIGS. 4 and 5 is described with reference to computing device 10 of FIGS. 1 and 2, in other examples, the technique of FIGS. 4 and 5 may be performed by another computing device or computing system, such as a computing device that includes more or fewer components that computing device 10.

FIG. 4 illustrates that computing device 10 may receive notification data (200). For example, notification client module 22 of computing device 10 may receive information transmitted by information server system 60 over network 30. The information received by notification client module 22 may indicate, for example, that an e-mail or text message was received at an account associated with computing device 10.

Computing device 10 may receive contextual information related to a user at a current time (210). For example, context module 24 may receive communications information, location information, time information, sensor information, and/or other types of information from various input devices, sensors, and/or communication units of computing device 10 and determine a context of the user of computing device 10. In some examples, context module 24 may determine a location, a speed, a direction, an acceleration, a velocity, an orientation, a pattern of vibration, and/or other degree of movement associated with computing device 10 and based on the degree of movement of computing device 10 over time, infer whether the user of computing device 10 is performing a physical or non-physical type of activity at the current time and/or a physiological condition of the user at the current time. In some examples, context module 24 may receive a heart rate, a blood pressure, a temperature, a galvanic skin level, or other physiological parameter of the user of computing device 10 and, based on physiological parameters of the user of computing device 10, context module 24 may infer a type of activity associated with the user at the current time and/or a physiological condition of the user at the current time.

In some examples, context module 24 may determine, based on the contextual information, a type of application being used by the user at the current time, and the computing device may determine, based on the type of application, the at least one of the physiological condition of the user at the current time or the type of activity associated with the user at the current time. For example, context module 24 may receive information from applications 52 indicating that an active application executing at computing device 10 corresponds to a fitness application (e.g., an electronic pedometer, an exercise tracking application, etc.). Context module 24 may determine that the user is performing a physical type of activity in response to determining that the active application is a fitness application and infer that the user of computing device 10 may be stressed.

In some examples, computing device 10 may determine that the type of application being used by the user at the current time includes either a game type application or a reading type application. Responsive to determining that the type of application is the game type application, computing device 10 may determine that the user is stressed. As another example, responsive to determining that the type of application is the reading type application, music type application, movie type application, etc. computing device 10 may determine that the user is relaxed.

For example, context module 24 may receive information indicating that the active one of applications 52 executing at computing device 10 at the current time is an adventure game that may increase the heart rate and/or adrenaline level of a user when playing the adventure game. As a result of implied or inferred increased heart rate and/or adrenaline level associated with the adventure game, context module 24 may infer that the user is stressed. In other instances, context module 24 may receive information indicating that the active one of applications 52 executing at computing device 10 at the current time is an electronic book reader, an electronic magazine application, a social media application, an instant messaging application, an e-mail application, or other type of readying type application that may or may not increase the heart rate and/or adrenaline level of the user when interacting with the reading type application. As a result of implied or inferred decreased heart rate and/or adrenaline level associated with the reading type application, context module 24 may infer that the user is not stressed or is relaxed.

FIG. 4 further illustrates that computing device 10 may select a type of somatosensory alert to output as an indication of the notification data based on the contextual information (220). For example, UI module 20 may receive information from context module 24 that indicates a type of activity associated with the user at the current time and/or a physiological condition of the user at the current time. Based on the information from context module 24. UI module 20 may select a type of somatosensory type alert with which to cue the user as to the receipt of the notification data without distracting, disturbing, and/or annoying the user at the current time. For instance, UI module 20 may select an electric stimulus type alert if the information from context module 24 indicates that the user is performing a physical activity or that the user is stressed at the current time. As another example, UI module 20 may select a low level vibration type alert if the information from context module 24 indicates that the user is performing a non-physical activity and/or that the user is not stressed and relaxed at the current time.

Computing device 10 may output a somatosensory alert of the selected type and based on the notification data, at the current time (230). For example, UI module 20 may send a command or instruction to SOD 14 that causes SOD 14 to output a somatosensory alert based on the notification data using the selected type of alert that UI module 20 selected based on the information from context module 24.

FIG. 5 illustrates further operations of computing device 10. For instance, FIG. 5 shows an additional example of operations of computing device 10 that may be performed by computing device 10 after step 230 of FIG. 4. FIG. 5 illustrates that after outputting, at a current time, a somatosensory alert based on the notification data, computing device 10 may receive additional contextual information related to the user, at a later time (240). In other words, context module 24 may continuously, periodically, and/or aperiodically receive contextual information related to the user and continuously, periodically, and/or aperiodically perform operations described above for determining an context of the user of computing device 10 in order to determine an updated context of the user at the later time. For example, in the morning, (e.g., at an earlier time), context module 24 may determine a physiological condition of the user and/or a type of activity associated with the user as the user is commuting to work. In the afternoon (e.g., at a later time), context module 24 may determine a different physiological condition of the user and/or a type of activity associated with the user as the user is eating lunch.

Computing device 10 may select a different type of somatosensory alert to output as the indication of the notification data based on the additional contextual information (250). For example, UI module 20 may receive updated information from context module 24 that indicates an updated physiological condition of the user and/or an updated activity associated with the user, at the later time. Based on the updated information from context module 24, UI module 20 may select a different or same, appropriate type of somatosensory alert with which to cue the user as to the receipt of the notification data without distracting, disturbing, and/or annoying the user at the later time. For instance, UI module 20 may select an electric stimulus type alert if the updated information from context module 24 indicates that the user is performing a physical activity or that the user is stressed at the current time. As another example, UI module 20 may select a low level vibration or SMA type alert if the information from context module 24 indicates that the user is performing a non-physical activity and/or that the user is not stressed and relaxed at the current time.

Computing device 10 may output a second somatosensory alert of the selected different type and based on the notification data at the later time (260). For example, UI module 20 may send a command or instruction to SOD 14 that causes SOD 14 to output, at a later time, a second somatosensory alert based on the notification data using the selected type of alert that UI module 20 selected based on the additional, updated, information received from context module 24.

Figure 6:
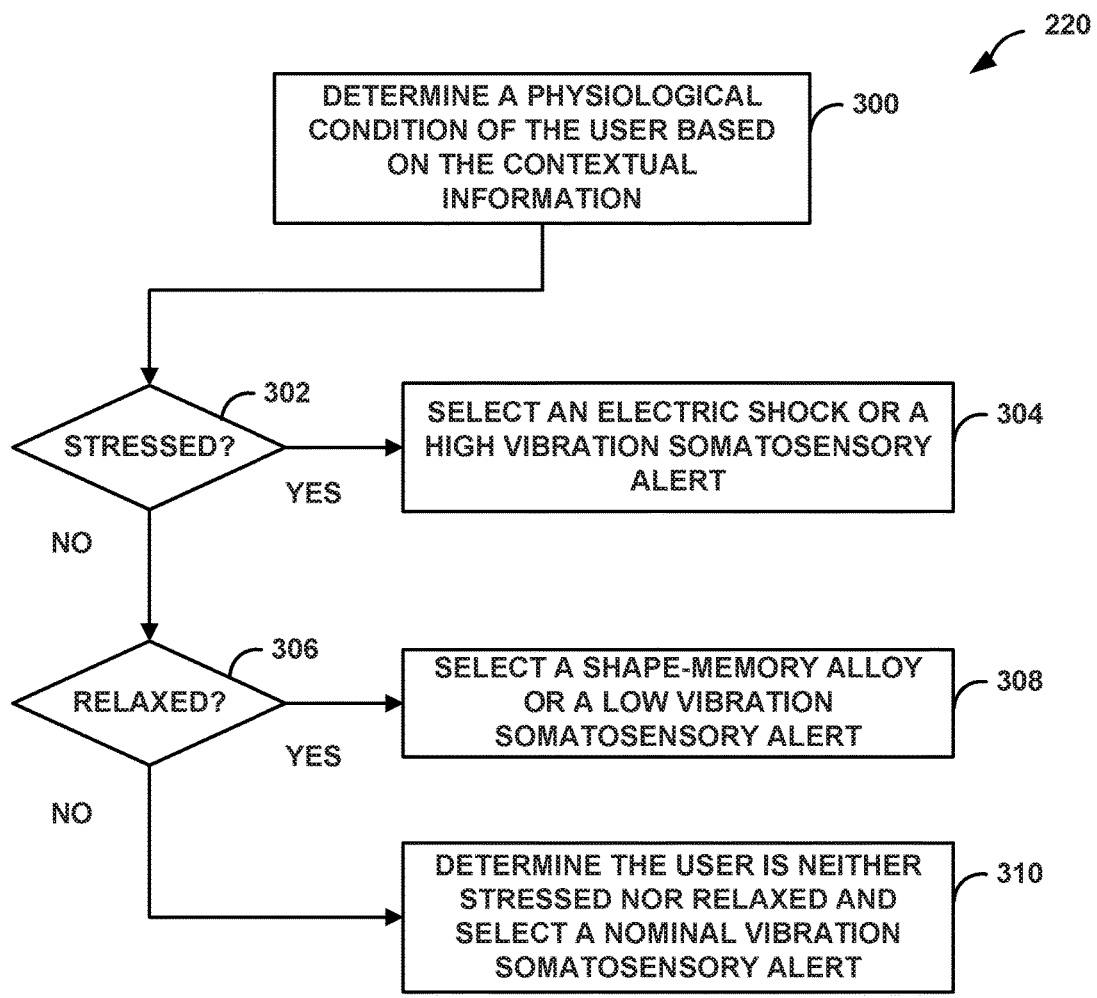
FIGS. 6 and 7 are flowcharts illustrating example operations of an example computing device configured to select a type of alert based at least in part on contextual information, in accordance with one or more aspects of the present disclosure.
Figure 7:
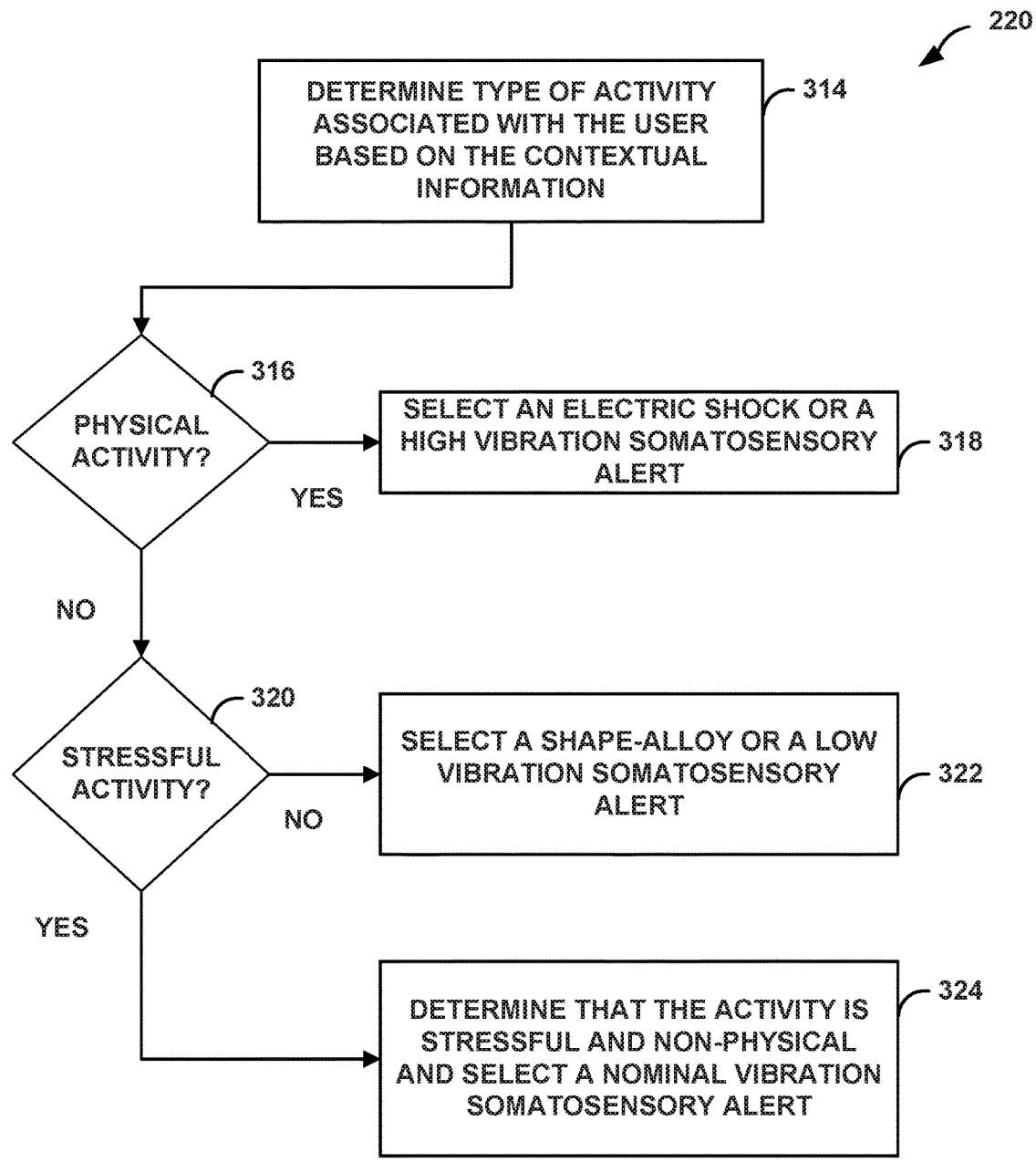

FIGS. 6 and 7 are flowcharts illustrating example operations of an example computing device configured to select a type of alert based at least in part on contextual information, in accordance with one or more aspects of the present disclosure. The processes of FIGS. 6 and 7 are each detailed examples of step 220 of the process shown in FIG. 4. As such, the processes of FIGS. 6 and 7 may be performed by one or more processors of a computing device, such as computing device 10 illustrated in FIG. 1 and FIG. 2. For purposes of illustration, FIGS. 6 and 7 are described below within the context of information server system 60, computing device 10, and system 1, illustrated in FIG. 1. In other words, FIGS. 6 and 7 are flowcharts illustrating at least some example operations performed by computing device 10 for selecting a type of somatosensory alert with which to indicate receipt of the notification data based on contextual information related to a user. Although the techniques of FIGS. 6 and 7 are described with reference to computing device 10 of FIGS. 1 and 2, in other examples, the technique of FIGS. 6 and 7 may be performed by another computing device or computing system, such as a computing device that includes more or fewer components that computing device 10.

FIG. 6 illustrates that computing device 10 may determine a physiological condition of the user based on the contextual information (300). For example, context module 24 may determine, based on the contextual information (e.g., at least one physiological parameter of the user alone, or in combination with other contextual information), that the physiological condition of the user indicates that the user is stressed, relaxed, or neither stressed nor relaxed, at the current time.

For example, context module 24 may determine that the user is likely stressed when context module 24 determines that the location and velocity of computing device 10 at the current time corresponds to a location and velocity of an automobile traveling along a roadway associated with the user's commute to work. As another example, context module 24 may determine that the user is likely relaxed when context module 24 determines that the location of computing device 10 at the current time corresponds to a home of the user and orientation data from a gyroscope of computing device 10 indicates that the user is lying down. As another example, context module 24 may determine that the user is likely neither stressed nor relaxed when context module 24 determines that heart rate data received from a heart rate monitor of computing device 10 falls within a threshold band for indicating a nominal heart rate at the current time and further determines that the location and velocity of computing device 10 at the current time does not correspond to a user driving to work, rather the location and velocity corresponds to a location and velocity associated with a vehicle traveling on a line of a transportation service (e.g., a train).

In any event, context module 24 of computing device 10 may output an indication of the physiological condition of the user at the current time to UI module 20. UI module 20 may receive the indication of the physiological condition of the user and, based on whether the physiological condition of the user indicates that user is stressed, relaxed, or neither stressed nor relaxed at the current time, UI module 20 may select the type of alert with which to indicate receipt of notification data.

As described above, in some examples, a more intense somatosensory type alert may be more effective in alerting the user of computing device 10 as to the receipt of the notification data than a less intense somatosensory type alert (e.g., a mild vibration)when the user is likely stressed or physically active. In some examples, a less intense (e.g., more subtle) somatosensory type alert (e.g., an SMA, type alert) may be effective in alerting the user of computing device 10 as to the receipt of the notification data, while being less intrusive than a more intense somatosensory type alert (e.g., an intense vibration), since the user is likely relaxed and/or physically inactive.

Responsive to context module 24 determining that the physiological condition of the user indicates that user is stressed (302), UI module 20 of computing device 10 may select an electric stimulus or a high (e.g., more intense) vibration somatosensory alert (304). In other words, UI module 20 may select a more intense type of somatosensory alert, such as a high vibration or an electric stimulus, when UI module 20 receives information from context module 24 specifying that a physiological condition of the user of computing device 10 indicates that the user is stressed.

Responsive to context module 24 determining that the physiological condition of the user indicates that user is relaxed (306), UI module 20 of computing device 10 may select a shape-memory alloy or a low (e.g., less intense) vibration somatosensory alert (308). In other words, UI module 20 may select a less intense type of somatosensory alert, such as a SMA alert or a low vibration, when UI module 20 receives information from context module 24 specifying that a physiological condition of the user of computing device 10 indicates that the user is relaxed.

Responsive to context module 24 determining that the physiological condition of the user indicates that user is neither stressed nor relaxed, UI module 20 of computing device 10 may select a nominal vibration (e.g., medium vibration that is less intense than a high vibration and more intense than a low vibration) somatosensory alert (310). In other words, UI module 20 may select a nominal intensity type of somatosensory alert, such as a nominal vibration, when UI module 20 receives information from context module 24 specifying that a physiological condition of the user of computing device 10 indicates that the user is neither stressed nor relaxed.

FIG. 7 illustrates further operations of computing device 10. For instance, FIG. 7 shows an additional example of operations of step 220 of the process shown in FIG. 3 that may be performed by computing device 10.

FIG. 7 illustrates that computing device 10 may determine a type of activity associated with the user based on the contextual information (314). For example, context module 24 may determine, based on the contextual information, that the type of activity associated with the user is either a physical activity or a non-physical activity. Context module 24 may output data indicating to UI module 20 that the user is performing a physical activity or non-physical activity at the current time. UI module 20 may use the indication of whether the activity associated with the user at the current time is either physical or non-physical to select the type of somatosensory alert with which to indicate, at the current time, receipt of notification data.

In some examples, context module 24 may determine that the user is likely performing a physical activity at the current time when context module 24 determines that the location and velocity of computing device 10 at the current time corresponds to a location and velocity of a person walking, jogging, running, bicycling or otherwise moving without using a motorized vehicle, along a pedestrian path, and prior to the time that the user normally leaves his or her home to commute for work. In some examples, context module 24 may determine that the user is likely performing a non-physical activity when context module 24 determines that the location and velocity of computing device 10 at the current time corresponds to a location and velocity of an automobile traveling along a roadway associated with the user's commute to work.

In some instances, context module 24 may determine, based on contextual information, an active one of applications 52 executing at computing device 10 at the current time and infer whether the user is performing a physical or non-physical activity at the current time, based on the type of application associated with the active application. For instance, when the type of application is a reading type application or a game type application, context module 24 may determine that the user is likely reading or gaming, and as such, performing a non-physical activity. When the type of application is an exercise tracking type application, context module 24 may determine that the user is likely exercising, and as such, performing a physical activity.

In any event, context module 24 of computing device 10 may output an indication of the type of activity associated with the user at the current time to UI module 20. UI module 20 may receive the indication of the type of activity, and, based on whether the type of activity is a physical or a non-physical activity, UI module 20 may select the type of alert with which to indicate receipt of notification data.

In some examples, when UI module 20 receives data from context module 24 indicating that physical activity associated with the user is a physical type of activity and that the user may be stressed at the current time. When UI module 20 receives data from context module 24 indicating that physical activity associated with the user is a non-physical type of activity, the data may further indicate that user is not necessarily stressed at the current time. UI module 20 may select a more intense type of somatosensory alert for alerting or cueing a user of computing device 10 to the receipt of notification data when UT module 20 receives data indicating that the user is stressed and/or that the user is performing a physical activity Responsive to context module 24 determining that the activity associated with the user is a physical activity (316), UI module 20 of computing device 10 may select an electric stimulus or a high (e.g., more intense) vibration somatosensory alert (318). In other words, UI module 20 may select a more intense type of somatosensory alert, such as a high vibration or an electric stimulus, when UI module 20 receives information from context module 24 indicative of the user performing a physical activity.

Responsive to context module 24 determining that the activity associated with the user is a non-physical activity (316), UI module 20 of computing device 10 may select a shape-memory alloy type alert or a vibration type alert with which to indicate receipt of notification data. In some examples, UI module 20 may select either the SMA type alert or the vibration type alert based on whether context module 24 determines whether the non-physical activity associated with the user is a stressful type of activity or a non-stressful type of activity.

Context module 24 may infer that a user may be stressed when a type of activity associated with a user is non-physical and the non-physical activity is a stressful type of activity (e.g., when the type of activity is playing a video game). Context module 24 may infer that a user may be not stressed or relaxed when a type of activity associated with a user is non-physical and the non-physical activity is not a stressful type of activity (e.g., when the type of activity is reading) Context module 24 may output data to UI module 20 indicating a physiological condition and/or type of activity that context module 24 infers of the user.

Responsive to context module 24 determining that the type of non-physical activity associated with the user at the current time is not stressful (320), UI module 20 of computing device 10 may select a SMA or a low vibration (e.g., less intense than high and medium vibrations) somatosensory alert (322). In other words, UI module 20 may select more subtle types of somatosensory type alerts to be output from SOD 14 when the type of non-physical activity is not stressful since the more subtle type alerts may be effective in obtaining the attention of the user when the user is performing a non-physical, and non-stressful activity, without disturbing, distracting, and/or annoying the user at the current time, is a less intense type of somatosensory alert, such as a SMA alert or a low vibration.

Responsive to context module 24 determining that the type of non-physical activity associated with the user at the current time is stressful (320), UI module 20 of computing device 10 may select a nominal vibration (e.g., more intense than a high vibration and less intense than a low vibration) somatosensory alert (324). For instance, UI module 20 may more subtle types of somatosensory type alerts (e.g., as a nominal or medium intensity vibration) when UI module 20 receives data from context module 24 indicating that the type of non-physical activity being performed by the user is stressful.

In this manner, computing device 10 may select a way in which the computing device 10 outputs somatosensory alerts based at least in part on the physiological condition and/or activity associated with the user at a current time. By selecting a type of somatosensory alert based on contextual information related to a user in this way, computing device 10 may increase a likelihood that the user of the computing device perceives (e.g., feels) an alert being outputted by the computing device, while reducing distraction, disturbance, or annoyance to the user with the output of the alert. For example, the user may be less likely to miss an alert based on notification data and computing device 10 may in turn output fewer subsequent alerts to convey the same information conveyed by a prior alert. As another example, the somatosensory alert may be better tailored to the current circumstances, such that the somatosensory alert is less likely to be more intense than necessary to alert the user to the receipt of notification data. Furthermore, computing device 10 may receive fewer inputs from a user to turn-off or disable alerts from the computing device 10 since the user may find these types of alerts to be more appealing than other types of alerts. By outputting fewer subsequent alerts and by receiving fewer inputs from the user, computing device 10 may perform fewer operations and consume less electrical power.

Clause 1. A method comprising: receiving, by a computing device, contextual information related to a user associated with the computing device, wherein the contextual information relates to at least one of a physiological condition of the user at a current time or a type of activity associated with the user at the current time; selecting, by the computing device, based at least in part on the contextual information, a type of alert to output as an indication of notification data, wherein the type of alert comprises at least one of an electric stimulus type alert, a shape-memory alloy type alert, and a vibration type alert; and outputting, by the computing device, an alert based on the notification data, the alert being of the selected type of alert.

Clause 2. The method of clause 1, further comprising: determining, by the computing device, based on the contextual information, that the physiological condition of the user indicates that the user is either stressed, relaxed, or neither stressed nor relaxed, at the current time; and wherein selecting, based on at least in part on the contextual information, the type of alert to output as the indication of the notification data comprises selecting, by the computing device, based on whether the physiological condition of the user indicates that user is either stressed, relaxed, or neither stressed nor relaxed, at the current time, the type of alert with which to indicate receipt of notification data.

Clause 3. The method of clause 2, wherein determining, based on the contextual information, that the physiological condition of the user indicates that the user is either stressed, relaxed, or neither stressed nor relaxed, at the current time comprises determining, based on the contextual information, that the physiological condition of the user indicates that the user is stressed at the current time, and wherein selecting, based on whether the physiological condition of the user indicates that the user is either stressed, relaxed, or neither stressed nor relaxed, at the current time, the type of alert with which to indicate receipt of notification data comprises responsive to determining that the physiological condition of the user indicates that user is stressed, selecting, by the computing device, an electric stimulus type alert to output as the indication of the notification data.

Clause 4. The method of any of clauses 2-3, wherein selecting, based on whether the physiological condition of the user indicates that the user is either stressed, relaxed, or neither stressed nor relaxed, at the current time, the type of alert with which to indicate receipt of notification data comprises responsive to determining that the physiological condition of the user indicates that user is relaxed, selecting, by the computing device; a shape-memory alloy type alert to output as the indication of the notification data.

Clause 5. The method of any of clauses 2-4, wherein selecting, based on whether the physiological condition of the user indicates that the user is either stressed, relaxed, or neither stressed nor relaxed, at the current time, the type of alert with which to indicate receipt of notification data comprises responsive to determining that the physiological condition of the user indicates that user is neither stressed nor relaxed, selecting, by the computing device, a vibration type alert to output as the indication of the notification data.

Clause 6. The method of any of clauses 1-5, further comprising: determining, by, the computing device, based on the contextual information; that the type of activity, associated with the user is either a physical activity or a non-physical activity; and wherein selecting, based on at least in part on the contextual information, the type of alert with which to indicate receipt of notification data comprises selecting, by the computing device, based on whether the activity associated with the user is either the physical activity or the non-physical activity, the type of alert to output as the indication of the notification data.

Clause 7. The method of clause 6, wherein selecting, based on whether the activity associated with the user is either the physical activity or the non-physical activity, the type of alert to output as the indication of the notification data comprises: responsive to determining that the type of alert is the non-physical activity, determining, by the computing device, whether the non-physical activity is a stressful type of activity or a non-stressful type of activity; and selecting, by the computing device, based on whether the non-physical activity is the stressful type of activity or the non-stressful type of activity, the type of alert to output as the indication of the notification data.

Clause 8. The method of any of clauses 6-7, wherein selecting, based on whether the activity associated with the user is either the physical activity or the non-physical activity, the type of alert to output as the indication of the notification data comprises responsive to determining that the activity associated with the user is a physical activity, selecting, by the computing device, an electric stimulus type alert to output as the indication of the notification data.

Clause 9. The method of any of clauses 6-8, wherein selecting, based on whether the activity associated with the user is either the physical activity or the non-physical activity, the type of alert to output as the indication of the notification data comprises responsive to determining that the activity associated with the user is a non-physical activity, selecting, by the computing device, a shape-memory alloy type alert or a vibration type alert to output as the indication of the notification data.

Clause 10. The method of any of clauses 1-9, wherein the contextual information comprises first contextual information, the selected type of alert comprises a first type of alert, and the alert comprises a first alert, the method further comprising: responsive to receiving second contextual information related to the user associated with the computing device at a later time, selecting, by the computing device, based at least in part on the second contextual information, a second type of alert to output as the indication of the notification data, wherein the second contextual information relates to at least one of a physiological condition of the user at a later time or a type of activity associated with the user at the later time; and outputting, by the computing device, at the later time, a second alert based on the notification data, the second alert being of the selected second type of alert.

Clause 11. The method of any of clauses 1-10, further comprising: determining, by the computing device, based on the contextual information, a type of application being used by the user at the current time; and determining, by the computing device, based on the type of application, the at least one of the physiological condition of the user at the current time or the type of activity associated with the user at the current time.

Clause 12. The method of clause 11, further comprising: wherein the type of application being used by the user at the current time comprises either a game type application or a reading type application, and wherein determining, based on the type of application, the at least one of the physiological condition of the user at the current time or the type of activity associated with the user at the current time comprises: responsive to determining that the type of application is the game type application, determining, by the computing device, that the physiological condition of the user indicates that user is stressed; and responsive to determining that the type of application is the reading type application, determining, by the computing device, that the physiological condition of the user indicates that user is relaxed.

Clause 13. A computing device comprising: at least one processor; and at least one module operable by the at least one processor to: receive contextual information related to a user associated with the computing device, wherein the contextual information relates to at least one of a physiological condition of the user at a current time or a type of activity associated with the user at the current time; select, based at least in part on the contextual information, a type of alert to output as an indication of notification data; wherein the type of alert comprises at least one of an electric stimulus type alert, a shape-memory alloy type alert, and a vibration type alert; and output an alert based on the notification data, the alert being of the selected type of alert.

Clause 14. The computing device of clause 13, wherein the at least one module further operable by the at least one processor to determine, based on the contextual information, that the physiological condition of the user indicates that the user is either stressed, relaxed, or neither stressed nor relaxed, at the current time; and wherein the at least one module is further operable by the at least one processor to select, based on at least in part on the contextual information, the type of alert to output as the indication of the notification data by at least selecting, based on whether the physiological condition of the user indicates that user is either stressed, relaxed, or neither stressed nor relaxed, at the current time, the type of alert to output as the indication of the notification data.

Clause 15. The computing device of clause 14, wherein the at least one module is further operable by the at least one processor to determine, based on the contextual information, that the physiological condition of the user indicates that the user is either stressed, relaxed, or neither stressed nor relaxed, at the current time by at least determining, based on the contextual information, that the physiological condition of the user indicates that the user is stressed at the current time, and wherein the at least one module is further operable by the at least one processor to select, based on whether the physiological condition of the user indicates that the user is either stressed, relaxed, or neither stressed nor relaxed, at the current time, the type of alert to output as the indication of the notification data by at least responsive to determining that the physiological condition of the user indicates that user is stressed, selecting, an electric stimulus type alert to output as the indication of the notification data.

Clause 16. The computing device of any of clauses 13-15, wherein the at least one module is further operable by the at least one processor to determine, based on the contextual information, that the type of activity associated with the user is either a physical activity or a non-physical activity; and wherein the at least one module is further operable by the at least one processor to select, based on at least in part on the contextual information, the type of alert to output as the indication of the notification data by at least selecting, based on whether the activity associated with the user is either the physical activity or the non-physical activity, the type of alert to output as the indication of the notification data.

Clause 17. The computing device of clause 16, wherein the at least one module is further operable by the at least one processor to select, based on whether the activity associated with the user is either the physical activity or the non-physical activity, the type of alert to output as the indication of the notification data by at least: responsive to determining that the type of alert is the non-physical activity, determine whether the non-physical activity is a stressful type of activity or a non-stressful type of activity; and select, based on whether the non-physical activity is the stressful type of activity or the non-stressful type of activity, the type of alert to output as the indication of the notification data.

Clause 18. A computer-readable storage medium comprising instructions that, when executed, configure one or more processors of a computing device to: receive contextual information related to a user associated with the computing device, wherein the contextual information relates to at least one of a physiological condition of the user at a current time or a type of activity associated with the user at the current time; select, based at least in part on the contextual information, a type of alert to output as the indication of the notification data, wherein the type of alert comprises at least one of an electric stimulus type alert, a shape-memory alloy type alert, and a vibration type alert; and output an alert based on the notification data, the alert being of the selected type of alert.

Clause 19. The computer-readable storage medium of clause 18, comprising further instructions that, when executed, configure the one or more processors of the computing device to: determine, based on the contextual information, that the physiological condition of the user indicates that the user is either stressed, relaxed, or neither stressed nor relaxed, at the current time; and select, based on at least in part on the contextual information, the type of alert to output as the indication of the notification data by at least selecting, based on whether the physiological condition of the user indicates that user is either stressed, relaxed, or neither stressed nor relaxed, at the current time, the type of alert to output as the indication of the notification data.

Clause 20. The computer-readable storage medium of any of clauses 18-19, comprising further instructions that, when executed, configure the one or more processors of the computing device to: determine, based on the contextual information, that the type of activity associated with the user is either a physical activity or a non-physical activity; and select, based on at least in part on the contextual information, the type of alert to output as the indication of the notification data by at least selecting, based on whether the activity associated with the user is either the physical activity or the non-physical activity, the type of alert to output as the indication of the notification data.

Clause 21. A computing device comprising means for performing any of the methods of clauses 1-12.

Clause 22. A computer-readable storage medium encoded with instructions for causing one or more programmable processors to perform any of the methods recited by clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or may include communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a computing device, contextual information associated with a user of the computing device;
   determining, by the computing device, based at least in part on the contextual information, at least one of a current physiological condition of the user or a type of activity currently being performed by the user;
   selecting, by the computing device, based at least in part on the at least one of the current physiological condition or the type of activity, a particular vibration pattern, from a plurality of vibration patterns, with which to output alerts for indicating a receipt of notification data; and
   responsive to receiving the notification data, outputting, by the computing device, with particular vibration pattern, a vibration alert indicating receipt of the notification data.

2. The method of claim 1, further comprising:
   determining, by the computing device, based on the contextual information, that the current physiological condition of the user is one of stressed, relaxed, and neither stressed nor relaxed,
   wherein the particular vibration pattern is selected based on whether the current physiological condition of the user is stressed, relaxed, or neither stressed nor relaxed.

3. The method of claim 2, further comprising:
   determining, based on the contextual information, that the current physiological condition of the user is stressed,
   wherein the particular vibration pattern is a high frequency or high amplitude vibration in response to determining that the current physiological condition of the user is stressed.

4. The method of claim 2, further comprising:
   determining, based on the contextual information, that the current physiological condition of the user is relaxed,
   wherein the particular vibration pattern is a low frequency or low amplitude vibration in response to determining that the current physiological condition of the user is relaxed.

5. The method of claim 2, further comprising:
   determining, based on the contextual information, that the current physiological condition of the user is neither stressed nor relaxed,
   wherein the particular vibration pattern is a moderate frequency or moderate amplitude vibration in response to determining that the current physiological condition of the user is neither stressed nor relaxed.

6. The method of claim 1, further comprising:
   determining, by the computing device, based on the contextual information, that the type of activity currently being performed by the user is either a physical activity or a non-physical activity;
   wherein the particular vibration pattern is selected based on the type of activity currently being performed by the user is either a physical activity or a non-physical activity.

7. The method of claim 6, further comprising:
determining, based on the contextual information, that the type of activity currently being performed by the user is a physical activity,
wherein the particular vibration pattern is a high level of intensity in response to determining that the type of activity currently being performed by the user is a physical activity.

8. The method of claim 6, further comprising:
determining, based on the contextual information, that the type of activity currently being performed by the user is a non-physical activity,
wherein the particular vibration pattern is a low or moderate level of intensity in response to determining that the type of activity currently being performed by the user is a non-physical activity.

9. The method of claim 6, further comprising:
responsive to determining that the type of activity currently being performed by the user is a non-physical activity, determining, by the computing device, whether the non-physical activity is a stressful type of activity or a non-stressful type of activity,
wherein the particular vibration pattern is selected based on whether the non-physical activity is a stressful type of activity or a non-stressful type of activity.

10. The method of claim 1, wherein the plurality of vibration patterns include a high intensity vibration, a low intensity vibration, and a moderate intensity vibration.

11. The method of claim 1, wherein the computing device is a wearable computing device.

12. The method of claim 1, wherein the notification data comprises information indicating that an event associated with the computing device has occurred.

13. The method of claim 1, further comprising:
determining, by the computing device, based on the contextual information, a type of application currently being used by the user,
wherein selecting the particular vibration pattern further comprises determining, based on the type of application, the at least one of the current physiological condition of the user or the type of activity currently being performed by the user.

14. The method of claim 13, wherein the type of application currently being used by the user comprises either a game type application or a reading type application, and determining the at least one of the current physiological condition of the user or the type of activity currently being performed by the user, based on the type of application, comprises:
responsive to determining that the type of application is the game type application, determining, by the computing device, that the current physiological condition of the user is stressed; and
responsive to determining that the type of application is the reading type application, determining, by the computing device, that the current physiological condition of the user is relaxed.

15. A computing device comprising:
at least one processor; and
at least one module operable by the at least one processor to:
receive contextual information associated with a user of the computing device;
determine, based at least in part on the contextual information, at least one of a current physiological condition of the user or a type of activity currently being performed by the user;
select, based at least in part on the at least one of the current physiological condition or the type of activity currently being performed by the user, a particular vibration pattern, from a plurality of vibration patterns, with which to output alerts for indicating a receipt of notification data; and
responsive to receiving the notification data, output, with the particular vibration pattern, a vibration alert indicating the receipt of the notification data.

16. The computing device of claim 15, wherein:
the at least one module is further operable by the at least one processor to determine, based on the contextual information, that the current physiological condition of the user is one of stressed, relaxed, and neither stressed nor relaxed; and
the particular vibration pattern is selected based on whether the current physiological condition of the user is stressed, relaxed, or neither stressed nor relaxed.

17. The computing device of claim 15, wherein:
the at least one module is further operable by the at least one processor to determine, based on the contextual information, that the type of activity currently being performed by the user is either a physical activity or a non-physical activity; and
the particular vibration pattern is selected based on the type of activity currently being performed by the user is either a physical activity or a non-physical activity.

18. A computer-readable storage medium comprising instructions that, when executed, cause one or more processors of a computing device to:
receive contextual information associated with a user of the computing device;
determine, based at least in part on the contextual information, at least one of a current physiological condition of the user or a type of activity currently being performed by the user;
select, based at least in part on the at least one of the current physiological condition or the type of activity currently being performed by the user, a particular vibration pattern, from a plurality of vibration patterns, with which to output alerts for indicating a receipt of notification data; and
responsive to receiving the notification data, output, with the particular vibration pattern, a vibration alert indicating the receipt of the notification data.

19. The computer-readable storage medium of claim 18, wherein the instructions, when executed, further cause the one or more processors of the computing device to:
determine, based on the contextual information, a type of application currently being used by the user; and
select the particular vibration pattern by at least determining, based on the type of application, the at least one of the current physiological condition of the user or the type of activity currently being performed by the user.

20. The computer-readable storage medium of claim 19, wherein:
the type of application currently being used by the user comprises either a game type application or a reading type application; and
the instructions, when executed, further cause the one or more processors of the computing device to determine the at least one of the current physiological condition of the user or the type of activity currently being performed by the user, based on the type of application, by at least:

responsive to determining that the type of application is the game type application, determine that the current physiological condition of the user is stressed; and responsive to determining that the type of application is the reading type application, determine that the current physiological condition of the user is relaxed.

\* \* \* \* \*